(12) United States Patent
Kim

(10) Patent No.: US 12,194,834 B2
(45) Date of Patent: Jan. 14, 2025

(54) ACTIVE AIR FLAP APPARATUS FOR VEHICLE

(71) Applicant: HYUNDAI MOBIS Co., Ltd., Seoul (KR)

(72) Inventor: Jang Ho Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 107 days.

(21) Appl. No.: 17/471,833

(22) Filed: Sep. 10, 2021

(65) Prior Publication Data

US 2022/0080823 A1     Mar. 17, 2022

(30) Foreign Application Priority Data

Sep. 11, 2020   (KR) .......................... 10-2020-0117196

(51) Int. Cl.
*B60K 11/08*   (2006.01)
*F01P 7/10*    (2006.01)

(52) U.S. Cl.
CPC .............. *B60K 11/085* (2013.01); *F01P 7/10* (2013.01)

(58) Field of Classification Search
CPC .......... B60K 11/085; B60K 11/06; F01P 7/10; F01P 2001/005; B60Y 2304/03; B60Y 2306/05
See application file for complete search history.

(56) References Cited

U.S. PATENT DOCUMENTS

| | | | | |
|---|---|---|---|---|
| 5,658,038 A * | 8/1997 | Griffin | ................. | B62D 35/001 296/180.1 |
| 8,473,164 B2 * | 6/2013 | Charnesky | ........... | B60K 11/085 123/41.04 |
| 9,840,144 B2 * | 12/2017 | Aizawa | ................. | B60R 19/023 |
| 10,029,558 B2 * | 7/2018 | Frayer, III | ........... | B60K 11/085 |
| 10,100,707 B2 * | 10/2018 | Wolf | .................... | B60K 11/085 |
| 10,118,480 B2 * | 11/2018 | Yasui | ................... | B60K 11/085 |
| 10,166,858 B2 * | 1/2019 | Ibañez | ................. | B60K 11/085 |
| 11,230,879 B2 * | 1/2022 | Manhire | .................. | E06B 9/02 |
| 2004/0250454 A1 * | 12/2004 | Jager | ....................... | E01H 5/061 37/266 |
| 2010/0243352 A1 * | 9/2010 | Watanabe | ............ | B60K 11/085 180/68.1 |
| 2010/0282533 A1 * | 11/2010 | Sugiyama | ............ | B60K 11/085 180/68.1 |
| 2011/0097984 A1 * | 4/2011 | Hasegawa | ............ | B60K 11/085 454/152 |

(Continued)

FOREIGN PATENT DOCUMENTS

KR          10-1575255 B1    12/2015

*Primary Examiner* — Kurt Philip Liethen
(74) *Attorney, Agent, or Firm* — Morgan, Lewis & Bockius LLP

(57) ABSTRACT

The present disclosure relates to a technology for reducing air resistance when a vehicle travels or cooling the inside of an engine room by being coupled to an air inlet of a grill. An active air flap apparatus for a vehicle includes a frame coupled to a rear surface of a grill, a lower flap member and an upper flap member each having rotatably fixed to the frame to open or close an air inlet disposed in the grill, and a link member connecting the lower flap member to an actuator to open or close the air inlet, in which upper ends of the lower flap member and the upper flap member are inclined in a rearward direction of the vehicle.

9 Claims, 20 Drawing Sheets

(56) References Cited

U.S. PATENT DOCUMENTS

| | | | |
|---|---|---|---|
| 2011/0226441 A1* | 9/2011 | Yamatani | B60H 1/00278 |
| | | | 165/47 |
| 2011/0226541 A1* | 9/2011 | Hori | B60K 11/085 |
| | | | 180/68.1 |
| 2011/0232981 A1* | 9/2011 | Hori | B60K 11/085 |
| | | | 180/68.1 |
| 2012/0132474 A1* | 5/2012 | Charnesky | B60K 11/085 |
| | | | 49/77.1 |
| 2012/0247018 A1* | 10/2012 | Stokes | B60K 11/085 |
| | | | 49/89.1 |

* cited by examiner

ACTIVE AIR FLAP APPARATUS FOR VEHICLE

CROSS-REFERENCE TO RELATED APPLICATION

This application claims priority to and the benefit of Korean Patent Application No. 10-2020-0117196, filed on Sep. 11, 2020, the disclosure of which is incorporated herein by reference in its entirety.

BACKGROUND

1. Technical Field

The present disclosure relates to a technology for reducing air resistance when a vehicle travels or cooling the inside of an engine room by being coupled to an air inlet of a grill.

2. Discussion of Related Art

In general, an exchange medium flows in heat exchangers. The heat exchange medium inside the heat exchanger and air outside the heat exchanger exchange heat with each other so that cooling or radiating heat is realized.

In order to stably operate various heat exchangers in engine rooms of vehicles, external air should be smoothly supplied into the engine rooms.

However, when a vehicle travels at a high speed, a large amount of outside air is introduced at a high speed, and thus, air resistance becomes very large. As a result, there is a problem in that fuel efficiency of a vehicle decreases.

In order to solve this problem, an active air flap has been developed, which can help improve fuel efficiency by increasing an opening angle during low-speed traveling to increase an amount of air inflow into the engine room and decreasing the opening angle during high-speed traveling to reduce the amount of air inflow.

The active air flap includes a flap member, and the flap member is mounted on a rear surface of a grill and rotates to open and close an air inlet formed in the grill. The air inlet is opened and closed according to the rotation of the flap member, and external air introduced through the air inlet is introduced or blocked.

Specifically, when the vehicle travels at high speed, the flap member closes the air inlet to improve fuel efficiency by reducing air resistance, and when the vehicle travels at low speed, the flap member opens the air inlet to introduce air into the engine room and cool the overheated engine room.

Meanwhile, when the flap member is mounted on the rear surface of the grill, a step is formed between the flap member and the air inlet due to a thickness of the grill. Due to the step, there is a problem in that traveling wind is in contact with the step while the vehicle travels, and thus, a wind noise is generated and fuel efficiency is reduced. In particular, due to the step, there is a problem in that aesthetic quality in an appearance of the grill is degraded.

Meanwhile, the flap member preferably includes a flap guard portion for opening or closing the air inlet and flap fixing portions formed at both ends of the flap guard portion. Moreover, an upper end of the flap fixing portion extends from an upper end of the flap guard portion, and a rib is formed between the upper ends of the flap fixing portion extending to the upper end of the flap guard portion. As the rib collides with external air introduced through the air inlet, air resistance is generated and a load is generated on a rotational force of the flap member. In particular, when the flap member is opened at about 45°, the greatest load is generated. Accordingly, since the flap member is inefficiently opened and closed due to the rib formed between the upper end of the flap guard portion and the flap fixing portion, there is a problem in that the fuel efficiency of the vehicle is reduced.

SUMMARY

The present disclosure is directed to providing an active air flap apparatus for a vehicle capable of reducing air resistance applied to a flap member when a vehicle travels by integrating a front surface of the flap member and a front surface of the grill.

The above and other objects, advantages and features of the present disclosure, and a method of achieving them will become apparent with reference to embodiments described below in detail in conjunction with the accompanying drawings.

According to an aspect of the present disclosure, there is provided an active air flap apparatus for a vehicle including a frame coupled to a rear surface of a grill, a lower flap member and an upper flap member each having rotatably fixed to the frame to open or close an air inlet disposed in the grill, and a link member connecting the lower flap member to an actuator to open or close the air inlet, in which upper ends of the lower flap member and the upper flap member are inclined in a rearward direction of the vehicle.

The frame may include two vertical frames disposed to be spaced a distance from each other, and two horizontal frames disposed on each of an upper end and a lower end of each of the two vertical frames to connect the two vertical frames to each other.

The lower flap member may open or close a lower region of the air inlet, and the upper flap member may be disposed on an upper portion of the lower flap member to open or close an upper region of the air inlet.

A width of the lower flap member may be greater than a width of the upper flap member, and the link member may be disposed between the lower flap member and the upper flap member.

The lower flap member may include two first flap fixing portions rotatably fixed to the two vertical frames, respectively, and a first flap guard portion disposed on front surfaces of the first flap fixing portions to connect the two first flap fixing portions to each other, and configured to open or close the air inlet according to rotation of the first flap fixing portions, and the upper flap member may include two second flap fixing portions rotatably fixed to the two vertical frames, respectively, and a second flap guard portion disposed on front surfaces of the second flap fixing portions to connect the two second flap fixing portions to each other, and configured to open or close the air inlet according to rotation of the second flap fixing portions.

An inclined portion, inclined substantially at 45° in the rearward direction, may extend from an upper end of each of the first flap guard portion and the second flap guard portion.

The link member may include a first connection bar of which a first end is connected to the actuator, and a second connection bar having a first end, a second end, and an intermediate portion between the first end and the second end, the intermediate portion being connected to a second end of the first connection bar, the first end of the second connection bar being connected to the lower flap member, and the second end of the second connection bar being connected to the upper flap member.

A first rotating shaft, rotatably coupling the first flap guard portion of the lower flap member to the frame, and a first coupling shaft, rotatably coupling the second connection bar to the lower flap member, may protrude from each of the first flap fixing portions of the lower flap member, a second rotating shaft, rotatably coupling the second flap guard portion of the upper flap member to the frame, and a second coupling shaft, rotatably coupling the second connection bar to the upper flap member, may protrude from each of the second flap fixing portions of the upper flap member, a driving shaft, to which the actuator is coupled to pass through the two vertical frames, may protrude from the first end of the first connection bar, and a connecting shaft, to which the intermediate portion of the second connection bar is rotatably coupled, may protrude from the second end of the first connection bar.

The actuator may be disposed on an outer surface of one of the two vertical frames, and the driving shaft may pass through the frame to be connected to the actuator.

According to another aspect of the present disclosure, there is provided an active air flap apparatus for a vehicle including a frame coupled to a rear surface of a grill, a lower flap member and an upper flap member having guide ribs arranged on rear surfaces of the lower and upper flap members, respectively, and rotatably fixed to the frame to open or close an air inlet disposed in the grill, and a link member connecting the lower flap member to an actuator to open or close the air inlet, in which the guide ribs of the lower and upper flap members extend in an X shape.

The guide ribs may be arranged on the rear surfaces of the lower flap member and the upper flap member in a left-right direction.

The guide ribs may guide a flow of air introduced from the air inlet when the lower flap member and the upper flap member are opened.

Each of the guide ribs may include an end, in a direction in which the lower flap member and the upper flap member extend, having a curved surface.

According to still another aspect of the present disclosure, there is provided an active air flap apparatus for a vehicle including a frame coupled to a rear surface of a grill, a lower flap member and an upper flap member rotatably fixed to the frame to open or close an air inlet disposed in the grill, and a link member connecting the lower flap member to an actuator to open or close the air inlet, in which a communication hole is formed in each of right and left sides of the lower flap member and the upper flap member.

The communication hole may be formed in each of two regions of the air inlet of the grill and may be covered with the grill when viewed from a front surface.

A guide rib may be disposed at a center of a rear surface of each of the lower flap member and the upper flap member, and the communication hole is formed in each of the right and left sides of each of the lower flap member and the upper flap member, and a reinforcing rib may be disposed inside the communication hole.

The guide rib may extend in an X shape and the reinforcing rib may extend in a triangular shape including two sides having the same length as each other inside the communication hole, and the guide rib may continuously extend from the reinforcing rib.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
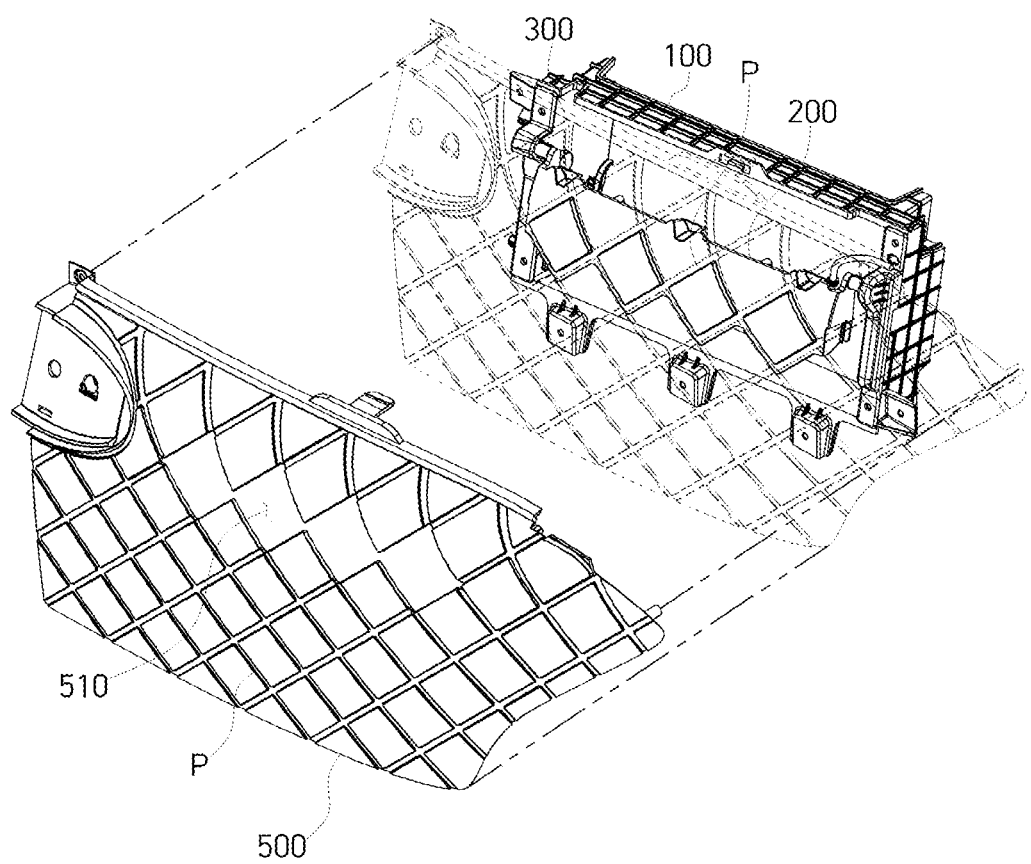
FIG. 1 is an exploded perspective view of an active air flap apparatus and a grill for a vehicle according to one embodiment of the present disclosure.

Embodiments of the present disclosure are provided to more completely describe the present disclosure to those of ordinary skill in the art, and the following embodiments may be modified in several different forms, and a scope of the present disclosure is not limited to the following embodiments. Rather, the embodiments are provided so that the present disclosure will be more thorough and complete and will fully convey a spirit of the present disclosure to those skilled in the art. In addition, in the following drawings, each component is exaggerated for convenience and clarity of description, and the same reference numerals refer to the same elements in the drawings. As used herein, a term "and/or" includes any one or all possible combinations of those listed items.

The terminology used herein is used to describe specific embodiments, not to limit the present disclosure.

As used herein, a singular form may include the plural form unless the context clearly dictates otherwise. Also, as used herein, "comprise" and/or "comprising" refers to the presence of recited shapes, numbers, steps, operations, members, elements, and/or groups thereof and does not exclude the presence or addition of one or more other shapes, numbers, operations, members, elements and/or groups.

Hereinafter, exemplary embodiments of the present disclosure will be described in detail with reference to the accompanying drawings.

Figure 2:
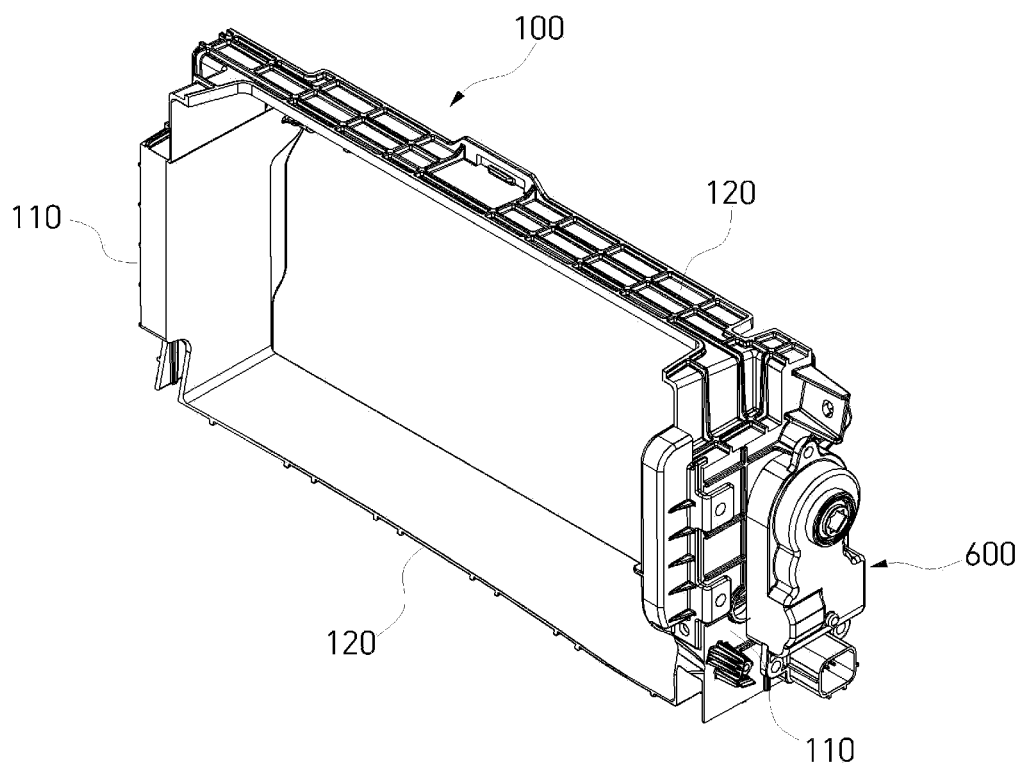
FIG. 2 is a perspective view illustrating a frame of the active air flap apparatus for a vehicle according to one embodiment of the present disclosure.
Figure 3:
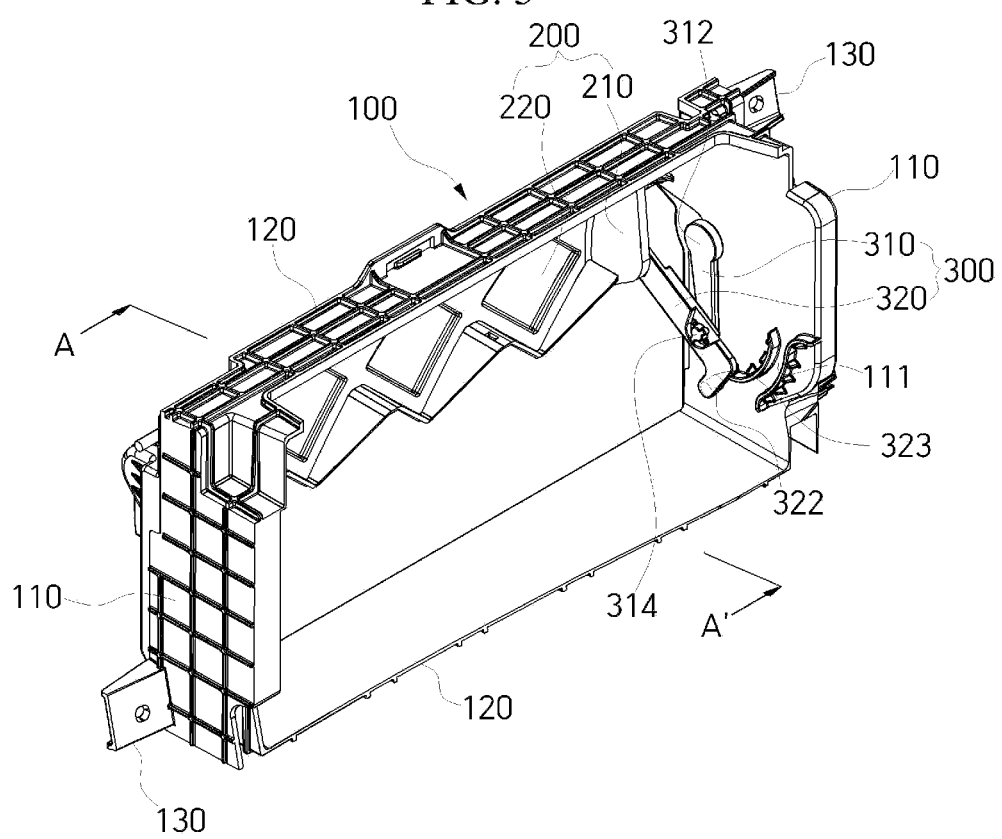
FIG. 3 is a perspective view illustrating the active air flap apparatus for a vehicle according to one embodiment of the present disclosure when viewed in one direction.
Figure 4:
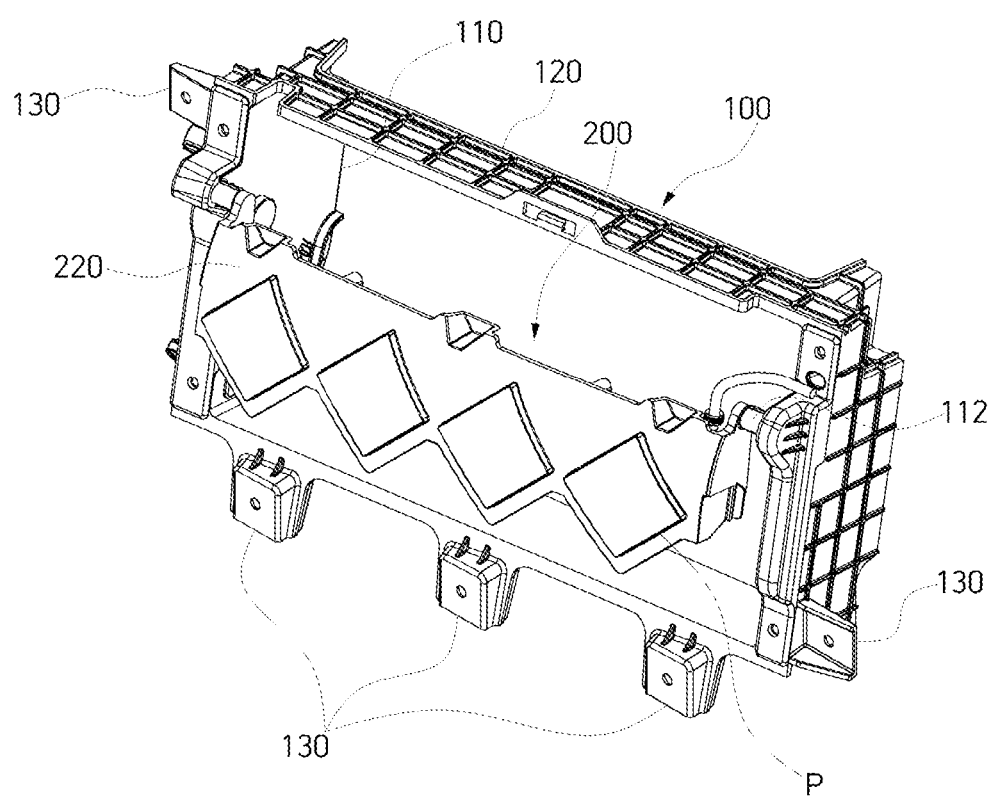
FIG. 4 is a perspective view illustrating the active air flap apparatus for a vehicle according to one embodiment of the present disclosure when viewed in the other direction.
Figure 5:
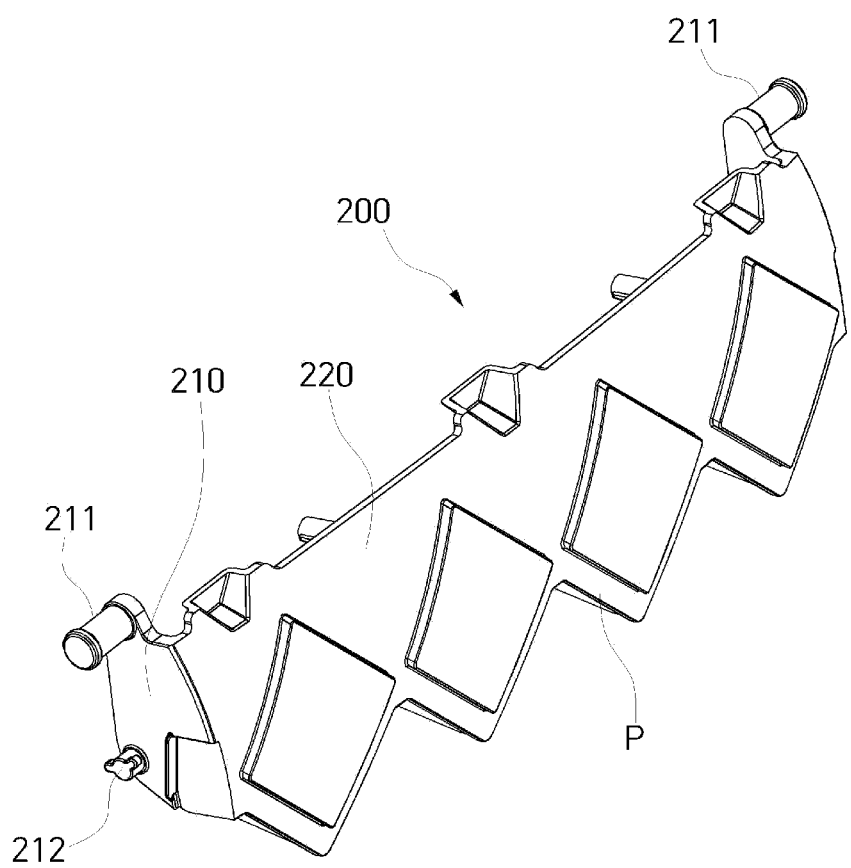
FIG. 5 is a perspective view illustrating a flap member of the active air flap apparatus for a vehicle according to one embodiment of the present disclosure.
Figure 6:
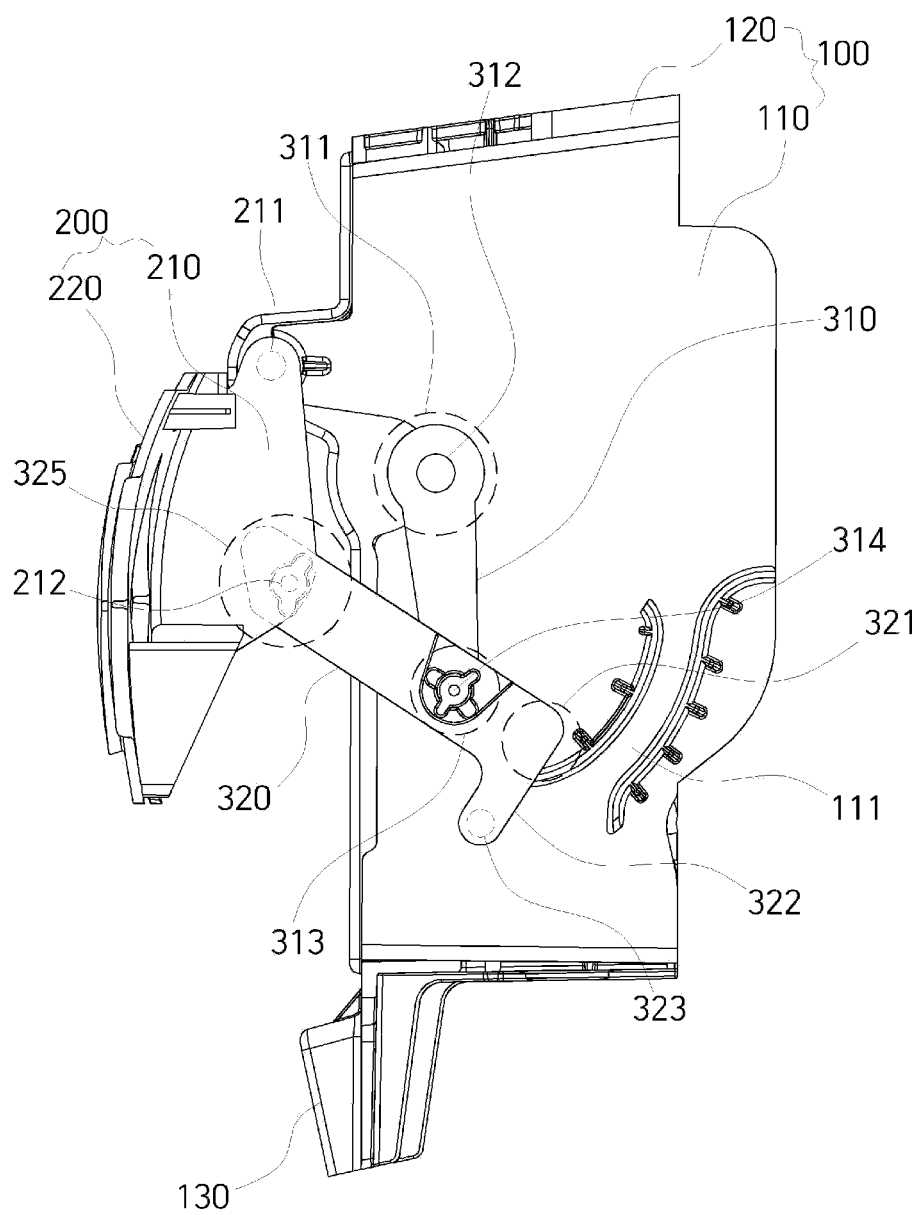
FIG. 6 is a cross-sectional view taken along line A-A' illustrated in FIG. 3.
Figure 7:
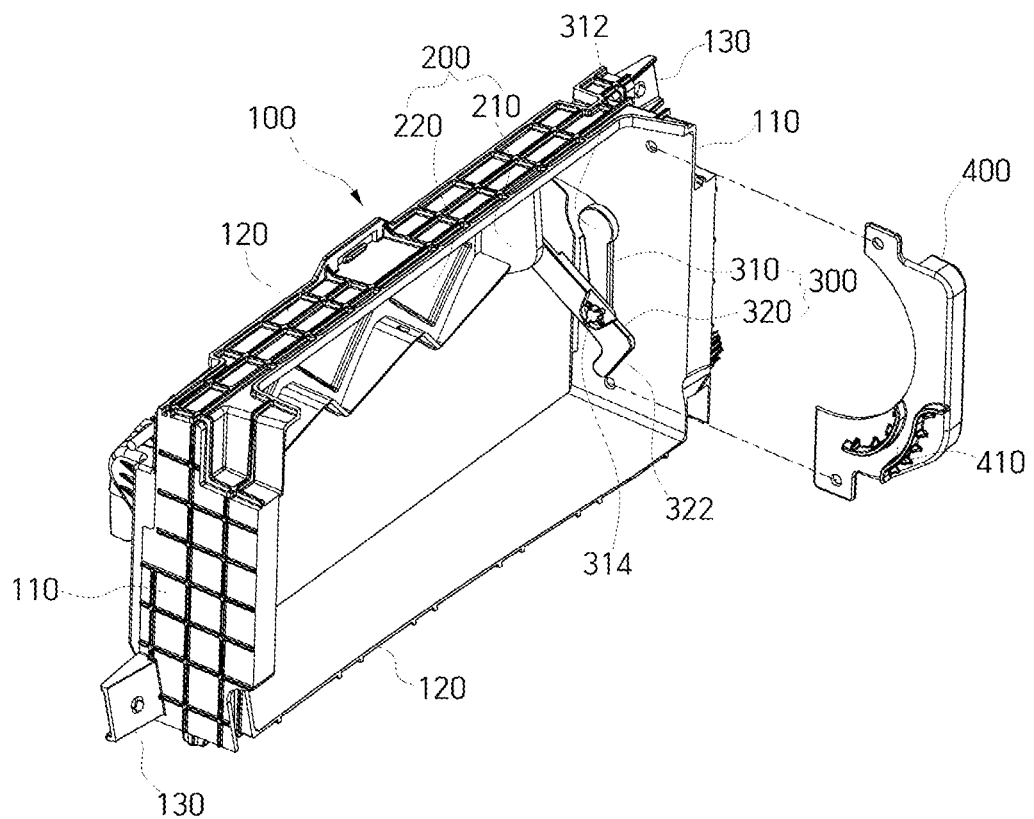
FIG. 7 is an exploded perspective view of an active air flap apparatus for a vehicle according to another embodiment of the present disclosure.

FIG. 1 is an exploded perspective view of an active air flap apparatus and a grill for a vehicle according to one embodiment of the present disclosure, FIG. 2 is a perspective view illustrating a frame of the active air flap apparatus for a vehicle according to one embodiment of the present disclosure, FIG. 3 is a perspective view illustrating the active air flap apparatus for a vehicle according to one embodiment of the present disclosure when viewed in one direction, FIG. 4 is a perspective view illustrating the active air flap apparatus for a vehicle according to one embodiment of the present disclosure when viewed in the other direction, FIG. 5 is a perspective view illustrating a flap member of the active air flap apparatus for a vehicle according to one embodiment of the present disclosure, FIG. 6 is a cross-sectional view taken along line A-A' illustrated in FIG. 3, and FIG. 7 is an exploded perspective view of an active air flap apparatus for a vehicle according to another embodiment of the present disclosure.

Referring to FIGS. 1 to 7, the active air flap apparatus for a vehicle includes a frame 100, a flap member 200, and a 4-bar link member 300.

Referring to FIGS. 1 and 2, the frame 100 has a quadrangular frame shape and is coupled to a region of an air inlet 510 formed in a grill 500 on a rear surface of the grill 500.

The flap member 200 and the 4-bar link member 300 are coupled to an inside of the frame 100, and an actuator 600 is coupled to an outside of the frame 100.

The frame 100 is coupled to the rear surface of the grill 500 in a screwing manner.

To this end, a plurality of fixing portions 130 are formed around the frame 100 to be spaced a distance from each other along a periphery of the frame 100.

In addition, a screw member passes through the fixing portion 130 in a direction of the grill 500 and is coupled to the rear surface of the grill 500.

Accordingly, the frame 100 may be firmly fixed to the grill 500 by being coupled to the grill 500 through the screw member passing through the fixing portion 130.

The frame 100 includes a vertical frame 110 and a horizontal frame 120.

The vertical frame 110 includes two panels, and the two panels are arranged to be spaced apart from each other in the horizontal direction in the area of the air inlet 510 on the rear surface of the grill 500.

The vertical frame 110 is disposed at each of both sides of the air inlet 510. That is, the vertical frame 110 is not exposed to the outside due to being covered by the grill 500 when the grill 500 is viewed from a front surface.

A guide groove 111 and a boss portion 112 are formed in the vertical frame 110.

Referring to FIG. 3, the guide groove 111 is formed in any one of the two vertical frames 110 and formed in a fan shape in an inner surface of the vertical frame 110.

In addition, the guide groove 111 may be formed at an angle of about 90°.

The 4-bar link member 300 is slidably inserted into the guide groove 111.

Accordingly, the guide groove 111 forms a rotational trajectory by guiding a rotational direction of the 4-bar link member 300 when the 4-bar link member 300 operates.

Referring to FIG. 4, the boss portion 112 has a cylindrical shape and extends from an inner surface of the vertical frame 110 in a direction in which the flap member 200 is disposed.

Moreover, a rotating shaft 211, which extends from the flap member 200 and passes through the vertical frame 110 and is connected to the actuator 600, is inserted into the boss portion 112. That is, an inner peripheral surface of the boss portion 112 surrounds an outer peripheral surface of the rotating shaft 211, and thus, the boss portion 112 can firmly support the rotating shaft 211.

Referring back to FIGS. 1 and 2, the horizontal frame 120 includes two panels, and the two panels are vertically spaced apart from each other in the area of the air inlet 510 on the rear surface of the grill 500.

In addition, the horizontal frames 120 are each disposed at the upper end and the lower end of the vertical frame 110 to connect the two vertical frames 110 to each other.

Accordingly, the frame 100 is formed in a quadrangular frame shape as a whole by the vertical frames 110 and the horizontal frames 120.

In addition, the horizontal frames 120 are each disposed at upper and lower portions of the air inlet 510. That is, the horizontal frame 120 is not exposed to the outside by being covered by the grill 500 when the grill 500 is viewed from a front surface.

Referring to FIGS. 1, 4, and 5, the flap member 200 is rotatably fixed to the vertical frames 110 constituting the frame 100 to open or close the air inlet 510 formed in the grill 500.

When the flap member 200 is opened while the vehicle travels, air is introduced from the outside of the grill 500 through the air inlet 510 to cool an inside of an engine room.

Moreover, when the flap member 200 is closed, air resistance is reduced to improve stability in traveling of the vehicle and improve fuel efficiency.

Accordingly, the flap member 200 can cool the inside of the engine room or effectively reduce air resistance depending on whether the flap member is opened or closed.

The flap member 200 includes a flap fixing portion 210 and a flap guard portion 220.

The flap fixing portion 210 includes two panels, and the two panels are disposed to be spaced apart from each other in the horizontal direction in the area of the air inlet 510 on the rear surface of the grill 500.

The flap fixing portions 210 are each fixed to be rotatable inside the two vertical frames 110 in a state of being spaced apart from each other in an inward direction from the two vertical frames 110.

A rotating shaft 211 and a coupling shaft 212 are formed in the flap fixing portion 210.

The rotating shaft 211 protrudes from an outer surface of the flap fixing portion 210 in a direction of the vertical frame 110 and rotatably couples the flap member 200 to the vertical frame 110.

Moreover, the rotating shaft 211 is inserted into the boss portion 112 extending from the inner surface of the vertical frame 110.

Accordingly, the rotating shaft 211 may be firmly supported by the boss portion 112 in a state in which the flap fixing portion 210 is spaced apart from the vertical frame 110.

The coupling shaft 212 rotatably couples the 4-bar link member 300 to the flap member 200.

The coupling shaft 212 is formed at a lower level than a position of the flap fixing portion 210 at which the rotating shaft 211 is formed. That is, the rotating shaft 211 is formed in an upper portion of the flap fixing portion 210, and the coupling shaft 212 is formed in a lower portion of the flap fixing portion 210.

The flap guard portion 220 includes one panel and is disposed on a front surface of the flap fixing portion 210 to connect the two flap fixing portions 210.

Accordingly, the flap guard portion 220 is connected to the flap fixing portions 210 to open or close the air inlet 510 according to a rotational force of the flap fixing portion 210.

Meanwhile, rhombus-shaped patterns are arranged on the front surface of the grill 500, and the same rhombus-shaped patterns as the patterns formed on the front surface of the grill 500 are also arranged on the front surface of the flap guard portion 220 in a left-right direction.

In addition, when the flap guard portion 220 closes the air inlet 510, the front surface of the flap guard portion 220 is exposed to the outside of the grill 500.

When the flap guard portion 220 closes the air inlet 510, the patterns formed on the front surface of the flap guard portion 220 continue from the patterns formed on the front surface of the grill 500.

Accordingly, a wind noise caused by the step of the air inlet 510 due to the thickness of the grill 500 on the front surface of the conventional flap guard portion 220 during traveling of a vehicle disappears, and aesthetic quality in an appearance of the grill 500 can be improved.

Meanwhile, as long as the patterns of the flap guard portion 220 can continue from the patterns formed on the front surface of the grill 500 when the flap guard portion 220 is closed, the flap guard portion 220 can be formed in any one or a combination of various shapes such as a triangular shape, a quadrangular shape, or a circular shape.

Referring to FIG. 6, the 4-bar link member 300 enables the flap member 200 to open or close the air inlet 510 and connects the flap member 200 and the actuator 600 to transmit driving force, using the actuator 600, to the flap member 200.

Moreover, the 4-bar link member 300 is disposed between the flap fixing portion 210 and the vertical frame 110, in which the guide groove 111 is formed, among the two vertical frames 110.

Accordingly, the flap member 200 and the vertical frame 110 are disposed to be spaced a distance from each other.

The 4-bar link member 300 includes a first connection bar 310 and a second connection bar 320.

The first connection bar 310 is disposed in the vertical frame 110 in which the guide groove 111 is formed among the two vertical frames 110, one end 311 of the first connection bar 310 is connected to the actuator 600, and the other end 313 thereof is connected to the second connection bar 320.

A driving shaft 312 and a connecting shaft 314 are formed on the first connection bar 310.

The driving shaft 312 protrudes from an outer surface of one end 311 of the first connection bar 310 in the direction in which the vertical frame 110 is disposed and passes through the vertical frame 110.

The end of the driving shaft 312 passing through the vertical frame 110 protrudes to the outside of the vertical frame 110, and the actuator 600 is coupled to the protruding end.

In addition, the driving shaft 312 receives the rotational force from the actuator 600 to rotate the first connection bar 310.

The connecting shaft 314 protrudes from an inner surface of the other end 313 of the first connection bar 310 in the direction in which the second connection bar 320 is disposed and is rotationally coupled to an intermediate portion of the second connection bar 320. That is, the connecting shaft 314 connects the first connection bar 310 and the second connection bar 320 to each other.

An intermediate portion of the second connection between one end 321 and the other end 325 is connected to the other end 313 of the first connection bar 310 through the connecting shaft 314, and the one end 321 is coupled to the coupling shaft 212 protruding from the side surface of the flap member 200.

Accordingly, the second connection bar 320 receives the rotational force of the actuator 600 transmitted to the first connection bar 310 through the connecting shaft 314 and transmits the rotation force to the flap fixing portion 210 through the coupling shaft 212.

A guide protrusion 323 is formed on the other end 325 of the second connection bar 320.

The guide protrusion 323 protrudes from the outer surface of the other end 325 of the second connection bar 320 and is inserted into the guide groove 111.

In addition, in another embodiment of the second connection bar 320, one end 321 of the second connection bar 320 is bent at a right angle to form a bent portion 322.

In addition, in the bent portion 322, the guide protrusion 323 extends in the direction of the guide groove 111 and is inserted into the guide groove 111.

When the first connection bar 310 and the second connection bar 320 connected to the first connection bar 310 are rotated by the operation of the actuator 600, the guide protrusion 323 inserted into the guide groove 111 moves along the guide groove 111.

Accordingly, a rotational trajectory of the second connection bar 320 is formed while the guide protrusion 323 moves along the guide groove 111.

In particular, the guide protrusion 323 is prevented from being separated from the guide groove 111 while moving along the guide groove 111.

Accordingly, the guide groove 111 forcibly limits the rotational trajectory of the second connection bar 320 to effectively prevent the second connection bar 320 from being twisted.

Meanwhile, the guide groove 111 according to another embodiment of the present disclosure may be formed in a separate guide member 400.

As illustrated in FIG. 7, the guide member 400 is fixed to any one of the two vertical frames 110 constituting the frame 100 and forcibly limits the rotational trajectory of the flap member 200.

Specifically, the guide member 400 is fitted in a fitting manner from a rear surface to a front surface of the vertical frame 110, screwed to a side surface, and fixed to the vertical frame 110.

A guide groove 410 is formed in the guide member 400.

The guide groove 410 is formed in a sector shape in an inner surface of the guide member 400. In addition, the guide groove 410 may be formed at an angle of about 90°.

The 4-bar link member 300 is slidably inserted into the guide groove 410.

Therefore, by assembling the guide member 400 in which the guide groove 410 is formed to the conventional frame 100, a manufacturing cost for manufacturing the frame 100 in which the guide groove is formed can be reduced.

The first connection bar 310, which is connected to the actuator 600 in the 4-bar link member 300 of the present disclosure having the above configuration and transmits power generated from the actuator 600 to the second connection bar 320, corresponds to the input link in a general 4-bar link. Moreover, the second connection bar 320, which connects the first connection bar 310 and the flap fixing portion 210 to each other, receives power from the first connection bar 310 and transmits the power to the flap fixing portion 210, corresponds to a coupler link in the general 4-bar link.

Moreover, the flap fixing portion 210, which receives power from the second connection bar 320 to rotate the flap guard portion 220, corresponds to an output link in the general 4-bar link. That is, in the present disclosure, by opening and closing the flap member 200 through the 4-bar link member 300, the flap member 200 is not formed with a step from the air inlet 510, and the patterns formed on the front surface of the flap member 200 continue from the patterns formed on the front surface of the grill 500.

Accordingly, the wind noise caused by the step of the air inlet 510 due to the thickness of the grill 500 on the front surface of the conventional flap guard portion 220 during travel of a vehicle disappears, and the aesthetic quality in an appearance of the grill 500 can be improved.

Hereinafter, an operation relationship of the active air flap apparatus for a vehicle according to one embodiment of the present disclosure configured as described above will be described in detail with reference to the drawings.

FIGS. 8A to 8D show an operation flowchart illustrating an operation sequence of the active air flap apparatus for a vehicle according to one embodiment of the present disclosure.

The actuator 600 is coupled to the driving shaft 312 passing through and protruding from the vertical frame 110 from one end 311 of the first connection bar 310, and the intermediate portion of the second connection bar 320 is rotatably coupled to the connecting shaft 314 protruding from the other end 313 of the first connection bar 310. That is, the first connection bar 310 and the second connection bar 320 are coupled by the connecting shaft 314.

In addition, one end 321 of the second connection bar 320 is coupled to the coupling shaft 212 protruding from the lower end of the flap fixing portion 210.

In addition, the rotating shaft 211 protrudes from the upper end of the flap fixing portion 210, and the rotating shaft 211 is rotatably coupled to the vertical frame 110.

Figure 8A:
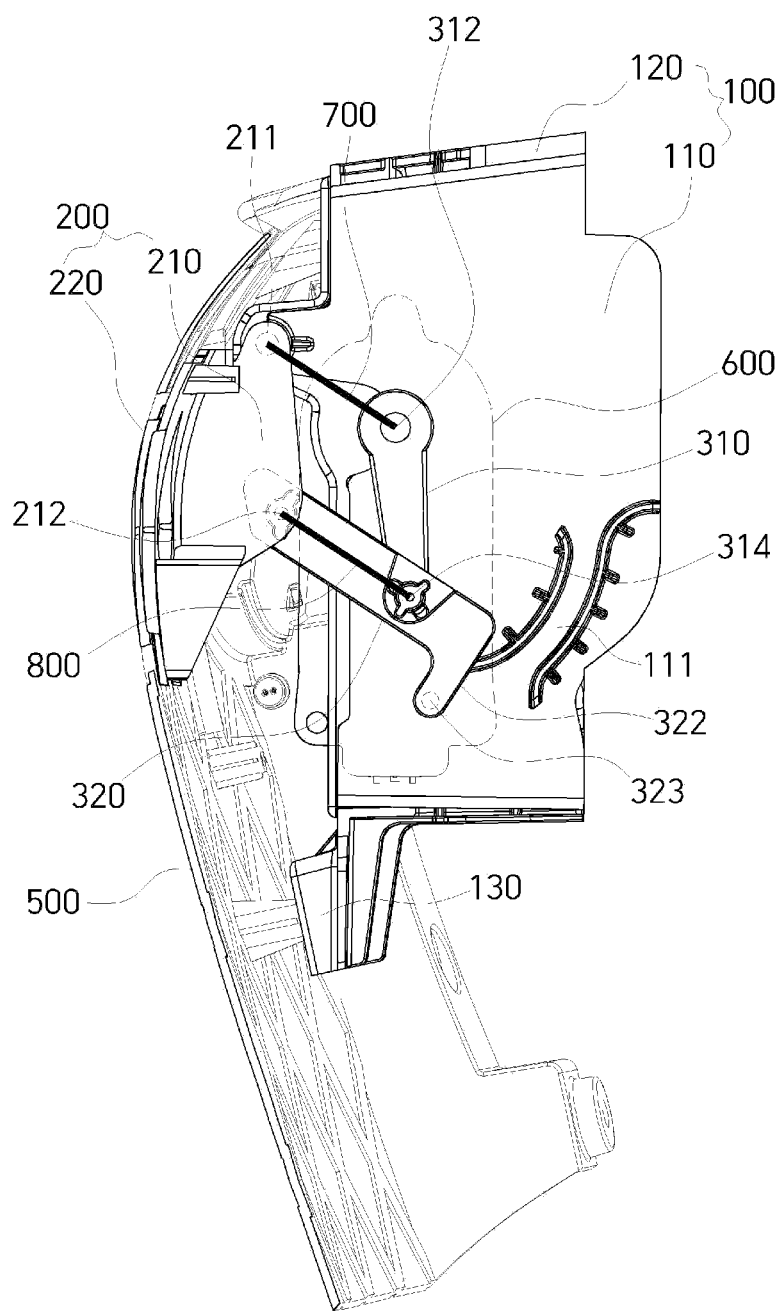
FIGS. 8A to 8D show an operation flowchart illustrating an operation sequence of an active air flap apparatus for a vehicle according to one embodiment of the present disclosure.

First, as illustrated in FIG. 8A, in the active air flap apparatus for a vehicle of the present disclosure having the coupling structure as described above, the flap guard portion 220 constituting the flap member 200 closes the air inlet 510 of the grill 500.

Figure 8B:
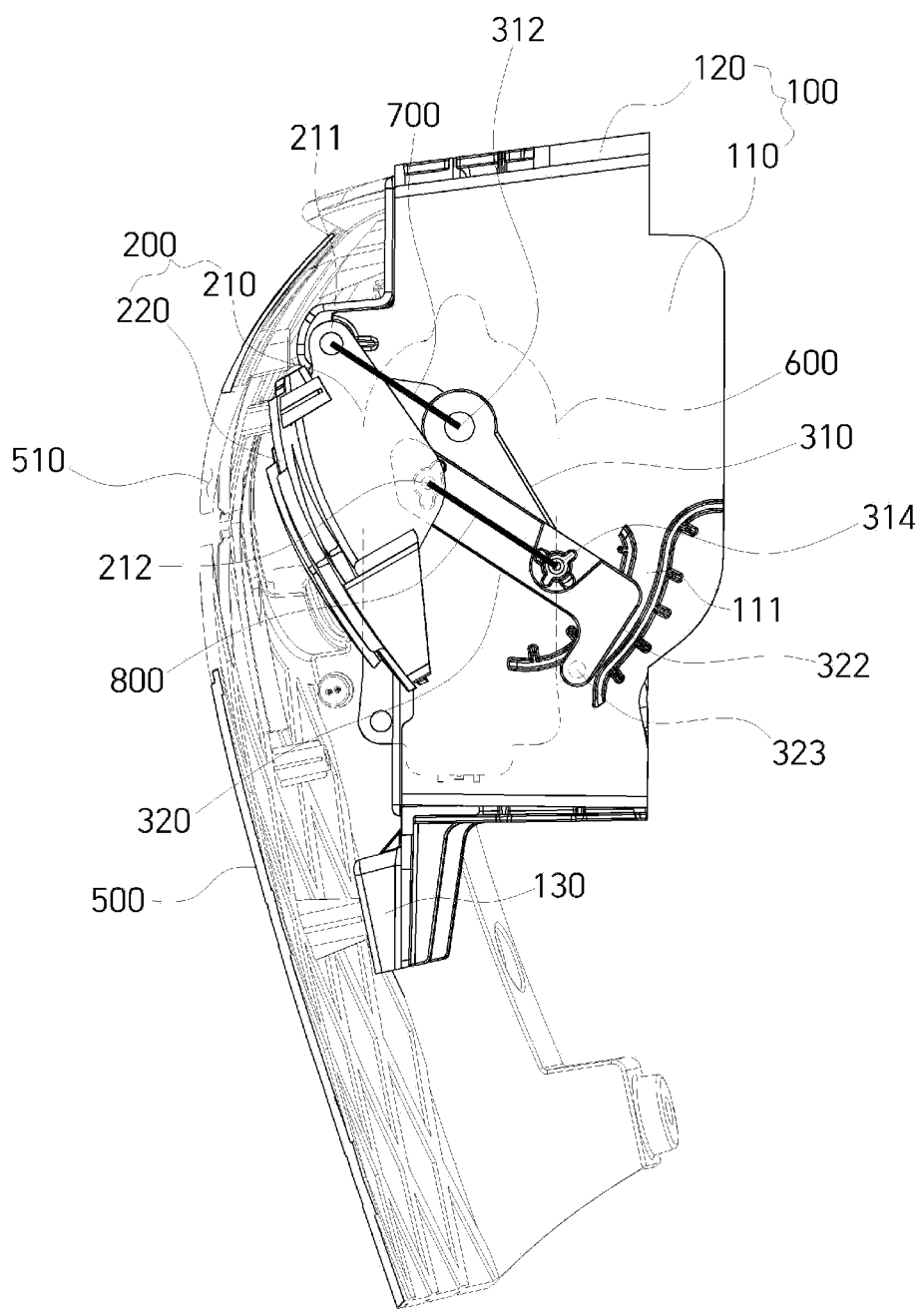

Moreover, when the actuator 600 operates, the driving shaft 312 of the first connection bar 310 coupled to the actuator 600 rotates as illustrated in FIG. 8B.

Accordingly, the first connection bar 310 rotates, and second connection bar 320 rotatably coupled to the first connection bar 310 through the connecting shaft 314 also rotates.

In this case, the guide protrusion 323 protruding in the direction of the vertical frame 110 from the other end 325 of the second connection bar 320 is inserted into the guide groove 111 formed in the vertical frame 110.

Figure 8C:
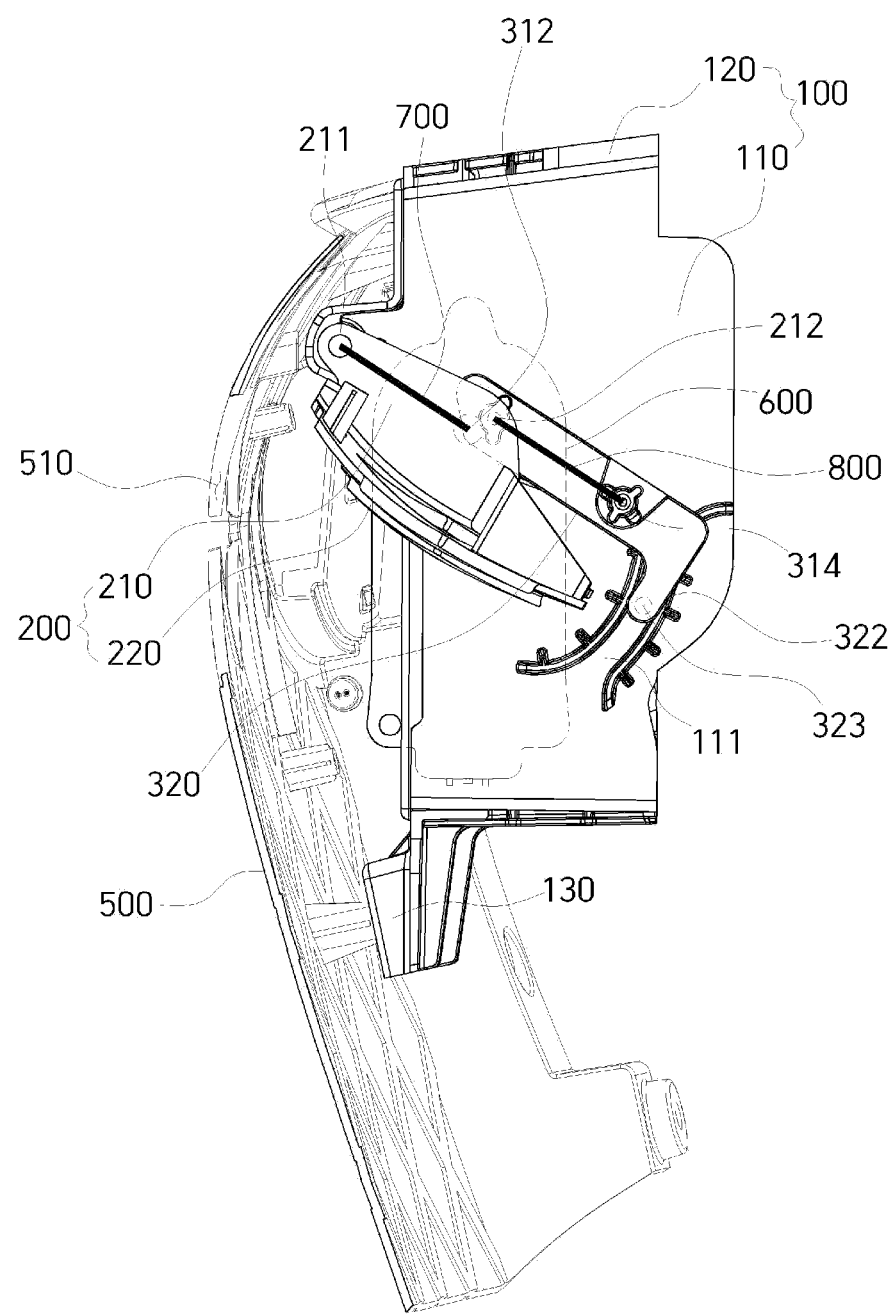
Figure 8D:
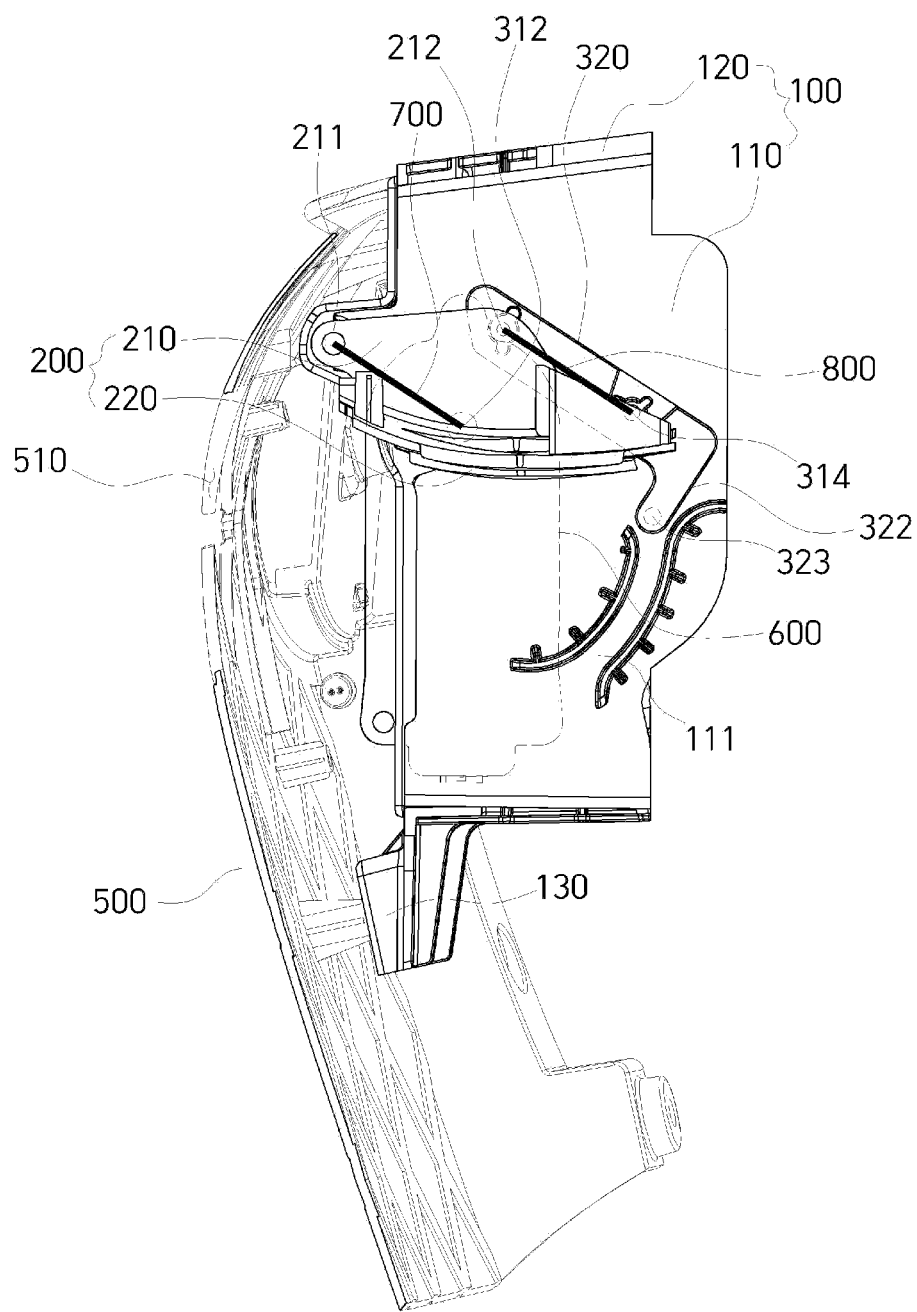

Moreover, when the first connection bar 310 and the second connection bar 320 are further rotated by the driving force of the actuator 600, as illustrated in FIG. 8C, the guide protrusion 323 rotates along the guide groove 111, and as illustrated in FIG. 8D, the flap member 200 fully opens the air inlet 510 formed in the grill 500.

Accordingly, the rotational trajectory of the second connection bar 320 is formed along the rotational direction of the guide protrusion 323.

In particular, the guide protrusion 323 is prevented from being separated from the guide groove 111 while moving along the guide groove 111. That is, the guide groove 111 forcibly limits the rotational trajectory of the second connection bar 320.

In this case, when the guide protrusion 323 moves along the guide groove 111, a first virtual line 700 connecting the rotating shaft 211 and the driving shaft 312 and a second virtual line 800 connecting the coupling shaft 212 and the connecting shaft 314 are maintained to be parallel to each other.

Therefore, the operation structure of the 4-bar link member 300 by the guide groove 111 and the guide protrusion 323 can effectively prevent the first connection bar 310 and the second connection bar 320 from being twisted with each other.

Meanwhile, an active air flap apparatus for a vehicle according to another embodiment of the present disclosure can reduce the air resistance applied to the flap member during traveling of a vehicle.

Hereinafter, another embodiment of the active air flap apparatus for a vehicle of the present disclosure will be described in detail with reference to the accompanying drawings.

Figure 9:
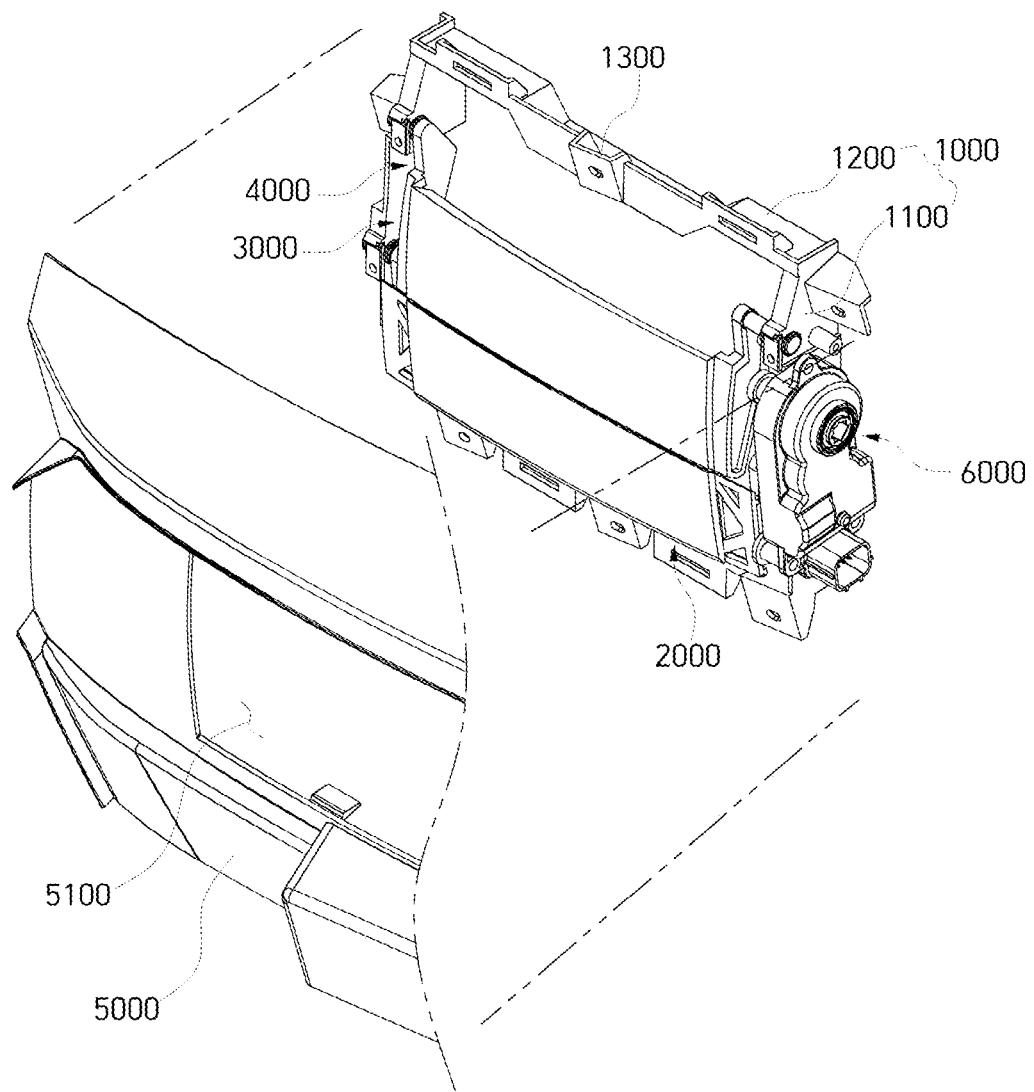
FIG. 9 is an exploded perspective view of an active air flap apparatus and a grill for a vehicle according to another embodiment of the present disclosure.
Figure 10:
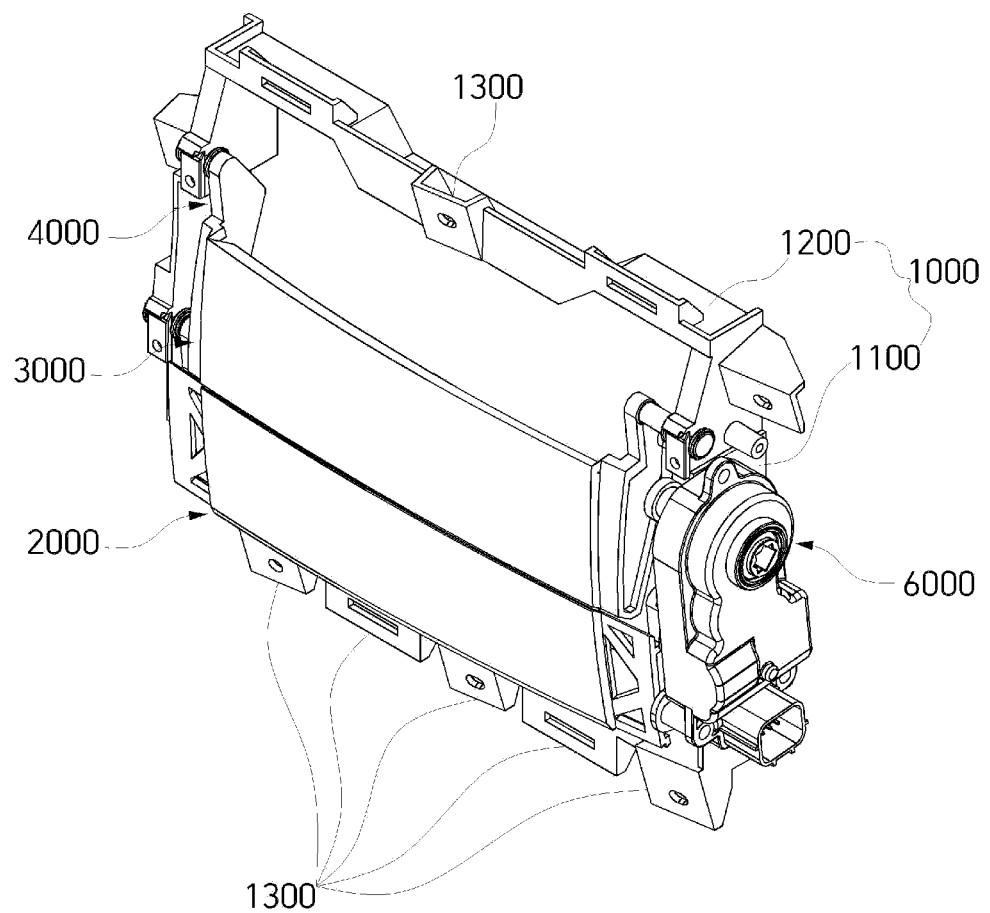
FIG. 10 is a perspective view illustrating the active air flap apparatus for a vehicle according to another embodiment of the present disclosure when viewed in one direction.
Figure 11:
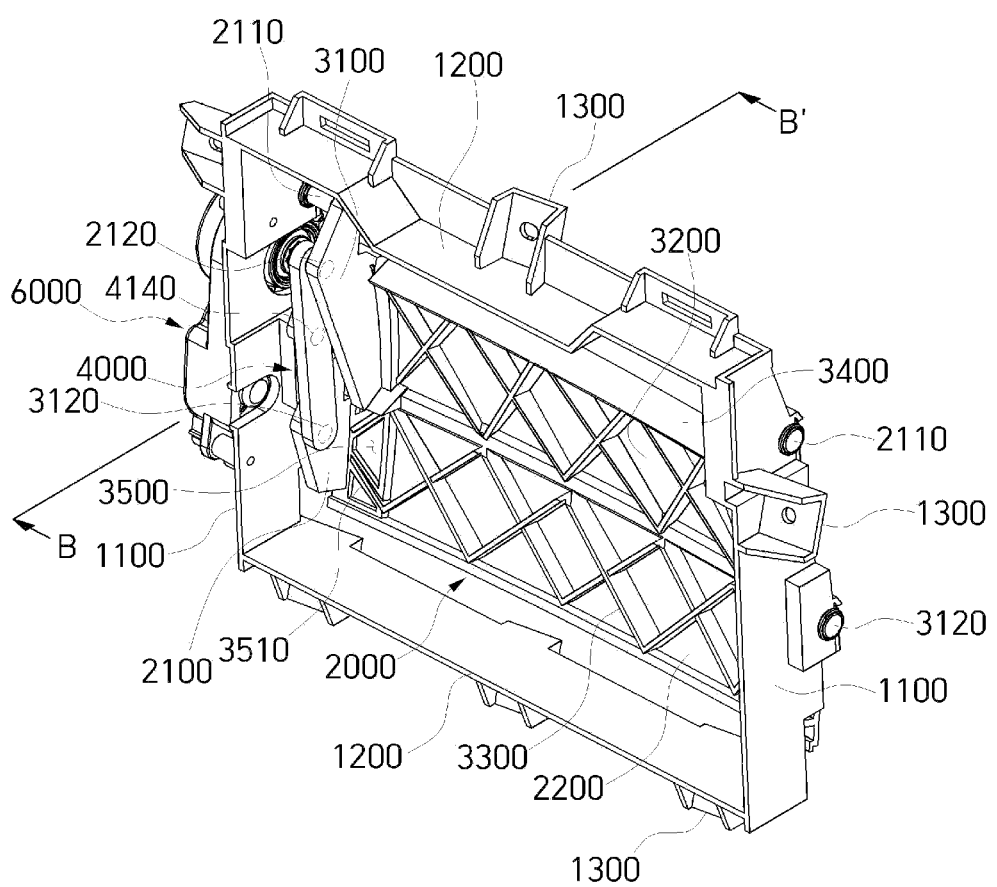
FIG. 11 is a perspective view illustrating the active air flap apparatus for a vehicle according to another embodiment of the present disclosure when viewed in the other direction.
Figure 12:
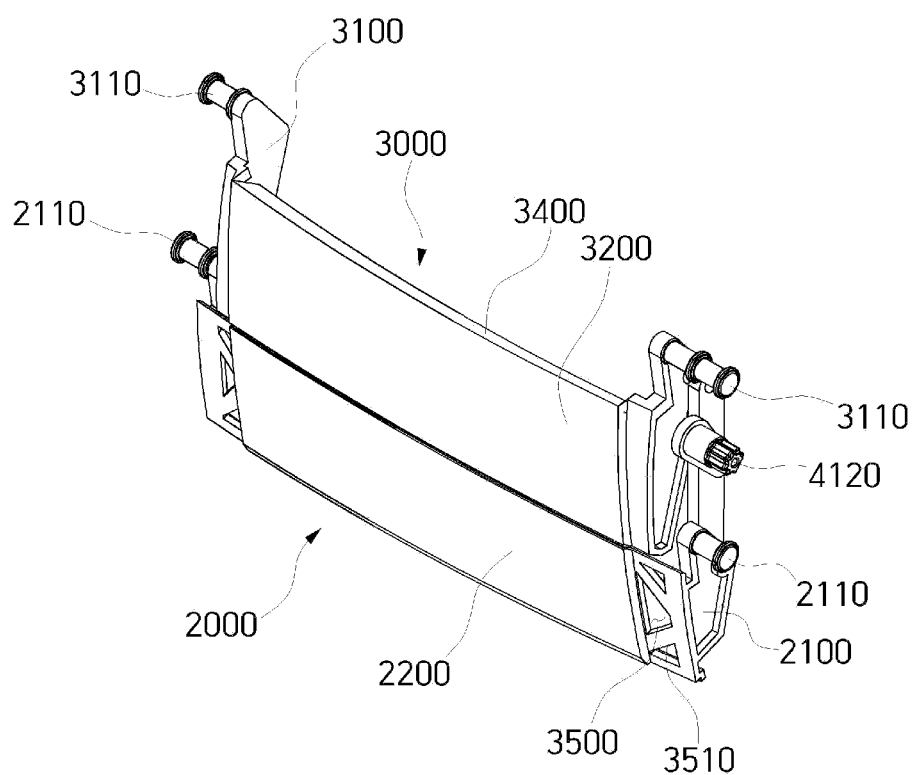
FIG. 12 is a perspective view illustrating a flap member of the active air flap apparatus for a vehicle according to another embodiment of the present disclosure.
Figure 13:
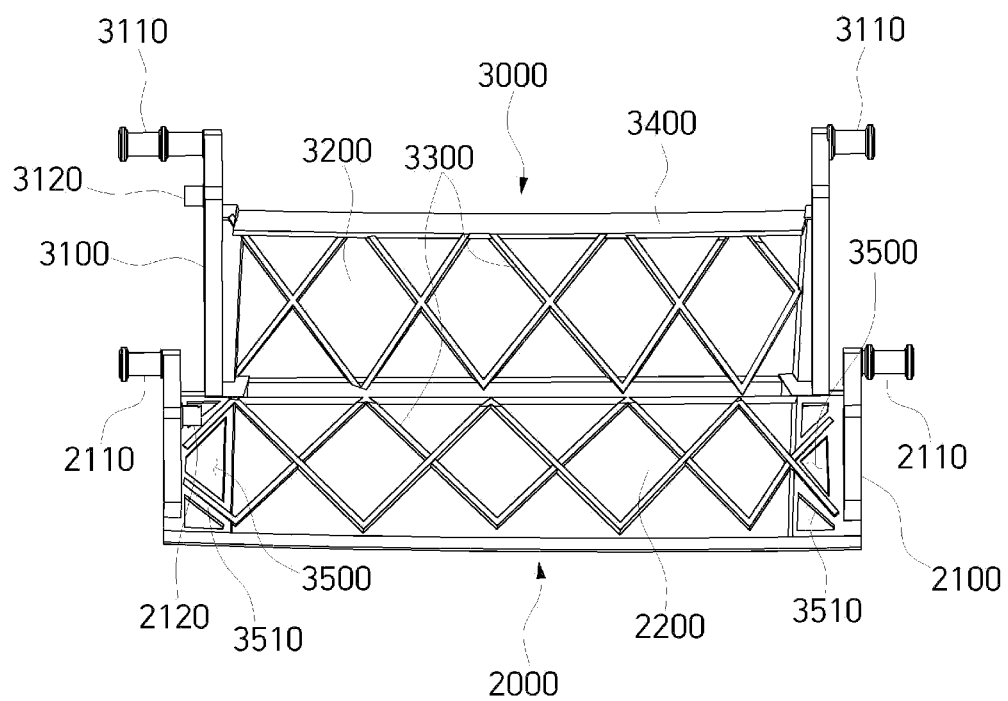
FIG. 13 is a rear view illustrating the flap member of the active air flap apparatus for a vehicle according to another embodiment of the present disclosure.
Figure 14:
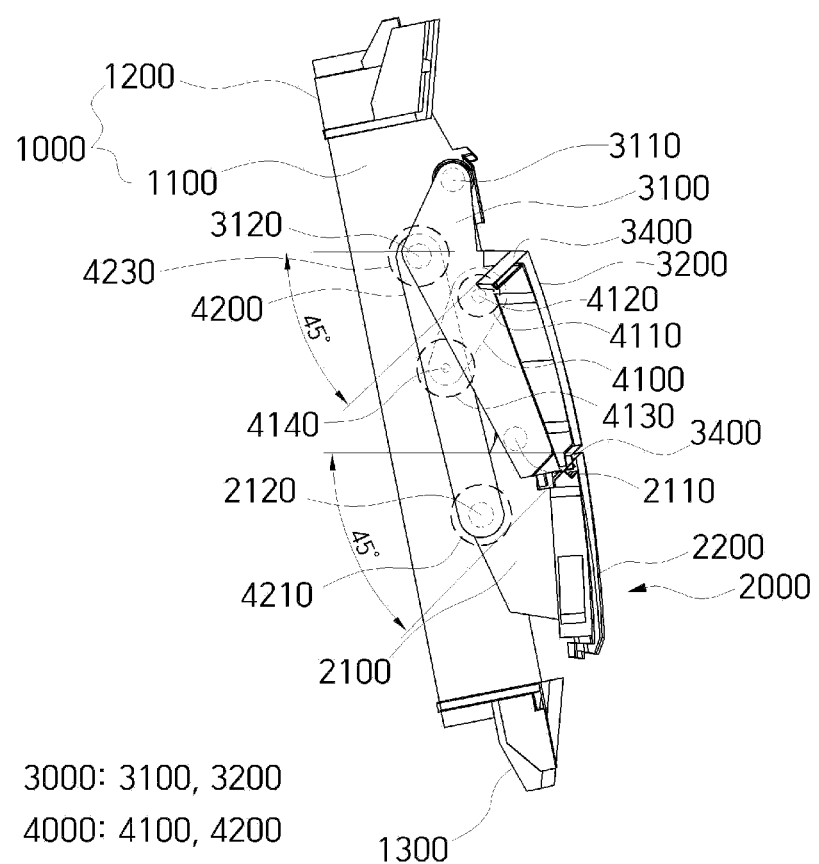
FIG. 14 is a cross-sectional view taken along line B-B' of FIG. 10.

FIG. 9 is an exploded perspective view of an active air flap apparatus and a grill for a vehicle according to another embodiment of the present disclosure, FIG. 10 is a perspective view illustrating the active air flap apparatus for a vehicle according to another embodiment of the present disclosure when viewed in one direction, FIG. 11 is a perspective view illustrating the active air flap apparatus for a vehicle according to another embodiment of the present disclosure when viewed in the other direction, FIG. 12 is a perspective view illustrating a flap member of the active air flap apparatus for a vehicle according to another embodiment of the present disclosure, FIG. 13 is a rear view illustrating the flap member of the active air flap apparatus for a vehicle according to another embodiment of the present disclosure, and FIG. 14 is a cross-sectional view taken along line B-B' of FIG. 10.

Referring FIGS. 9 to 14, the active air flap apparatus for a vehicle according to another embodiment of the present disclosure includes a frame 1000, a lower flap member 2000, an upper flap member 3000, and a link member 4000.

The frame 1000 has the shape of a quadrangular frame as illustrated in FIGS. 9 to 11 and is coupled to the area of an air inlet 5100 formed in a grill 5000 on a rear surface of the grill 5000.

The frame 1000 is coupled to the rear surface of the grill 5000 in a screwing manner.

To this end, a plurality of fixing portions 1300 are formed around the frame 1000 to be spaced a distance from each other along the circumference of the frame 1000.

In addition, a screw member passes through the fixing portion 1300 in a direction of the grill 5000 and is coupled to the rear surface of the grill 5000.

Accordingly, the frame 1000 may be firmly fixed to the grill 5000 by being coupled to the grill 5000 through the screw member passing through the fixing portion 1300.

The frame 1000 includes a vertical frame 1100 and a horizontal frame 1200.

The vertical frame 1100 includes two panels, and the two panels are arranged to be spaced apart from each other in the horizontal direction in the area of the air inlet 5100 on the rear surface of the grill 5000.

The vertical frame 1100 is disposed on each of both sides of the air inlet 5100. That is, the vertical frame 1100 is not exposed to the outside by being covered by the grill 5000 when the grill 5000 is viewed from a front surface.

The horizontal frame 1200 includes two panels, and the two panels are vertically spaced apart from each other in the area of the air inlet 5100 on the rear surface of the grill 5000.

In addition, the horizontal frames 1200 are each disposed at the upper end and the lower end of the vertical frame 1100 to connect the two vertical frames 1100 to each other.

Accordingly, the frame 1000 is formed in a quadrangular frame shape as a whole by the vertical frames 1100 and the horizontal frames 1200.

In addition, the horizontal frames 1200 are each disposed at the upper and lower portions of the air inlet 5100. That is, the horizontal frame 1200 is not exposed to the outside by being covered by the grill 5000 when the grill 5000 is viewed from a front surface.

The upper ends of the lower flap member 2000 and the upper flap member 3000 are inclined in a rearward direction, and the lower flap member 2000 and the upper flap member 3000 are each rotatably fixed to the vertical frames 1100 constituting the frame 1000 to open or close the air inlet 5100 formed in the grill 5000.

Specifically, the lower flap member 2000 is disposed at a lower portion of the frame 1000 to open or close a lower region of the air inlet 5100, and the upper flap member 3000 is disposed at an upper portion of the lower flap member 2000 to open or close an upper region of the air inlet 5100.

When the lower flap member 2000 and the upper flap member 3000 are opened while the vehicle travels, air is introduced from the outside of the grill 5000 through the air inlet 5100 to cool the inside of the engine room.

In addition, when the lower flap member 2000 and the upper flap member 3000 are closed, air resistance is reduced to improve the stability in traveling of the vehicle and improve fuel efficiency.

Accordingly, the lower flap member 2000 and the upper flap member 3000 can cool the inside of the engine room or effectively reduce the air resistance depending on whether the lower flap member 2000 and the upper flap member 3000 are opened or closed.

The lower flap member 2000 includes a first flap fixing portion 2100 and a first flap guard portion 2200.

As illustrated in FIGS. 1 and 11 to 13, the first flap fixing portion 2100 includes two panels, and the two panels are horizontally spaced apart from each other in the area of the air inlet 5100 on the rear surface of the grill 5000.

The first flap fixing portions 2100 are each fixed to be rotatable inside the two vertical frames 1100 in a state of being spaced apart from each other in an inward direction from the two vertical frames 1100.

A first rotating shaft 2110 and a first coupling shaft 2120 are formed in the first flap fixing portion 2100.

The first rotating shaft 2110 protrudes from an outer surface of the first flap fixing portion 2100 in a direction of the vertical frame 1100 and rotatably couples the lower flap member 2000 to the vertical frame 1100, and the first coupling shaft 2120 rotatably couples the link member 4000 from the first flap fixing portion 2100 of the lower flap member 2000.

The first coupling shaft 2120 is formed at a lower level than a position of the first flap fixing portion 2100 at which the first rotating shaft 2110 is formed. That is, the first rotating shaft 2110 is formed in an upper portion of the first flap fixing portion 2100, and the first coupling shaft 2120 is formed in a lower portion in the first flap fixing portion 2100.

The first flap guard portion 2200 includes one panel and is disposed on front surfaces of the first flap fixing portion 2100 to connect the two first flap fixing portions 2100.

Accordingly, the first flap guard portion 2200 is connected to the first flap fixing portion 2100 to open or close the air inlet 5100 according to a rotational force of the first flap fixing portion 2100.

The upper flap member 3000 includes a second flap fixing portion 3100 and a second flap guard portion 3200.

The second flap fixing portion 3100 includes two panels, and the two panels are disposed to be spaced apart from each other in the horizontal direction in the area of the air inlet 5100 on the rear surface of the grill 5000.

The second flap fixing portions 3100 are each fixed to be rotatable inside the two vertical frames 1100 in a state of being spaced apart from each other in an inward from the two vertical frames 1100.

A second rotating shaft 3110 and a second coupling shaft 3120 are formed in the second flap fixing portion 3100.

The second rotating shaft 3110 protrudes in the direction of the vertical frame 1100 from the outer surface of the second flap fixing portion 3100 and rotatably couples the upper flap member 3000 to the vertical frame 1100, and the second coupling shaft 3120 rotatably couples the link member 4000 from the second flap fixing portion 3100 of the upper flap member 3000.

The second coupling shaft 3120 is formed at a lower level than a position of the second flap fixing portion 3100 at which the second rotating shaft 3110 is formed. That is, the second rotating shaft 3110 is formed in an upper portion of the second flap fixing portion 3100, and the second coupling shaft 3120 is formed in a lower portion of the second flap fixing portion 3100.

The second flap guard portion 3200 includes one panel and is disposed on the front surfaces of the second flap fixing portion 3100 to connect the two second flap fixing portions 3100.

Accordingly, the second flap guard portion 3200 is connected to the second flap fixing portion 3100 to open or close the air inlet 5100 according to the rotational force of the second flap fixing portion 3100.

Meanwhile, an inclined portion 3400, a guide rib 3300, and a communication hole 3500 are formed at the first flap guard portion 2200 and the second flap guard portion 3200.

When upper ends of the first flap guard portion 2200 and the second flap guard portion 3200 are viewed from a side surface, the inclined portion 3400 is inclined substantially at 45° in a rearward direction, that is, in the direction in which the engine room is disposed. That is, when the lower flap member 2000 and the upper flap member 3000 are opened substantially 45° from the air inlet 5100, the inclined portion 3400 becomes horizontal. One or ordinary skill in the art would understand that the expression "substantially 45°" refers to substantially the same angle as 45° by allowing process errors, positional deviations, and/or measurement errors that may occur in a manufacturing process.

Accordingly, when the lower flap member 2000 and the upper flap member 3000 are opened 45° from the air inlet

5100, the inclined portion 3400 can minimize the air resistance applied to the lower flap member 2000 and the upper flap member 3000 during the traveling of the vehicle.

The guide ribs 3300 extend in the rearward direction of the first flap guard portion 2200 and the second flap guard portion 3200, that is, from the surface in the direction in which the engine room is disposed, and are arranged in a left-right direction from the rear surfaces of the first flap guard portion 2200 and the second flap guard portion 3200.

The guide ribs 3300 are formed in an X-shape.

Specifically, in the guide rib 3300, a pair of corners among the four corners are disposed at the first flap guard portion 2200 and the second flap guard portion 3200 in an up-down direction, and the other pair of corners are disposed at the first flap guard portion 2200 and the second flap guard portion 3200 in a left-right direction.

That is, the guide ribs 3300 are formed in an X-shape, and thus, when the lower flap member 2000 and the upper flap member 3000 are opened, air introduced from the outside through the air inlet 5100 can be efficiently introduced along a diagonal line forming the X-shape.

In particular, the guide rib 3300 has a curved end in the direction in which the first flap guard portion 2200 and the second flap guard portion 3200 extend.

Accordingly, when the lower flap member 2000 and the upper flap member 3000 are opened, the guide rib 3300 allows air introduced from the outside through the air inlet 5100 to be introduced more efficiently along the end of the guide rib 3300 that has a curved surface.

The communication hole 3500 is formed in each of left and right sides of the first flap fixing portion 2100 and includes an empty space having a shape of a quadrangular frame. That is, the communication hole 3500 can reduce weight of the lower flap member 2000 to significantly reduce a load acting on the actuator 6000 when the lower flap member 2000 is opened or closed.

Moreover, when the lower flap member 2000 is closed, the lower flap member 2000 is not exposed to the outside by being covered by the grill 500 in a case where the lower flap member 2000 is viewed from a front surface.

Accordingly, the communication hole 3500 is covered by the grill 5000 when the lower flap member 2000 is closed, and thus, aesthetic quality in an appearance of the grill 5000 can be improved.

A reinforcing rib 3510 is disposed inside the communication hole 3500.

The reinforcing rib 3510 connects one surface and the other surface to each other inside the communication hole 3500 and is formed in a triangular shape with two sides having the same length.

Accordingly, the reinforcing ribs 3510 can firmly support the communication hole 3500 formed in the shape of a quadrangular frame.

In addition, preferably, the guide rib 3300 and the reinforcing rib 3510 are formed in a continuous shape.

Meanwhile, the communication hole 3500 is illustrated as being formed only in the lower flap member 2000 in the drawings. However, as long as the weight of the upper flap member 3000 can be reduced and the upper flap member 3000 can be covered by the grill 5000, the communication hole 3500 and the reinforcing rib 3510 may be each formed at left and right sides of the upper flap member 3000.

In addition, the case is described in which the flap member includes the lower flap member 2000 and the upper flap member 3000, that is, two flap members. However, it is also possible to use one flap member depending on a usage environment of the active air flap.

Meanwhile, a width of the lower flap member 2000 is greater than a width of the upper flap member 3000, and the link member 4000 is disposed between the lower flap member 2000 and the upper flap member 3000.

As illustrated in FIG. 14, the link member 4000 allows the lower flap member 2000 and the upper flap member 3000 to open or close the air inlet 5100 and connects the lower flap member 2000, the upper flap member 3000, and the actuator 6000 to transmit a driving force generated by the actuator 6000 to the lower flap member 2000 and the upper flap member 3000.

In addition, the link member 4000 is disposed between any one of the two vertical frames 1100 and the second flap fixing portion 3100.

Accordingly, the lower flap member 2000 and the upper flap member 3000 are disposed to be spaced a distance from the vertical frame.

The link member 4000 includes a first connection bar 4100 and a second connection bar 4200.

The first connection bar 4100 is disposed on any one of the two vertical frames 1100 as illustrated in FIGS. 11 and 14, one end 4110 of the first connection bar 4100 is connected to the actuator 6000 and connected, and the other end 4130 thereof is connected to the second connection bar 4200.

A driving shaft 4120 and a connecting shaft 4140 are formed on the first connection bar 4100.

The driving shaft 4120 protrudes from an outer surface of the one end 4110 of the first connection bar 4100 in the direction in which the vertical frame 1100 is disposed and passes through the vertical frame 1100.

The end of the driving shaft 4120 passing through the vertical frame 1100 protrudes to the outside of the vertical frame 1100, and the actuator 6000 is coupled to the protruding end.

Then, the driving shaft 4120 receives the rotational force from the actuator 6000 to rotate the first connection bar 4100.

The connecting shaft 4140 protrudes from an inner surface of the other end 4130 of the first connection bar 4100 in the direction in which the second connection bar is disposed, and is rotatably coupled to an intermediate portion of the second connection bar 4200. That is, the connecting shaft 4140 connects the first connection bar 4100 and the second connection bar 4200 to each other.

An intermediate portion of the second connection bar 4200 is connected to the other end 4230 of the first connection bar 4100 through the connecting shaft 4140, the one end 4210 is coupled to the coupling shaft 2120 protruding from the side surface of the first flap fixing portion 2100, and the other end 4230 is coupled to the second coupling shaft 3120 protruding from the side surface of the second flap fixing portion 3100.

Accordingly, the second connection bar 4200 receives the rotational force of the actuator 6000 transmitted to the first connection bar 4100 through the connecting shaft 4140 and transmits the rotational force to each of the first flap fixing portion 2100 and the second flap fixing portion 3100 through the first coupling shaft 2120 and the second coupling shaft 3120.

Hereinafter, an operation relationship of the active air flap apparatus for a vehicle according to one embodiment of the present disclosure configured as described above will be described in detail with reference to the drawings.

Figure 15A:
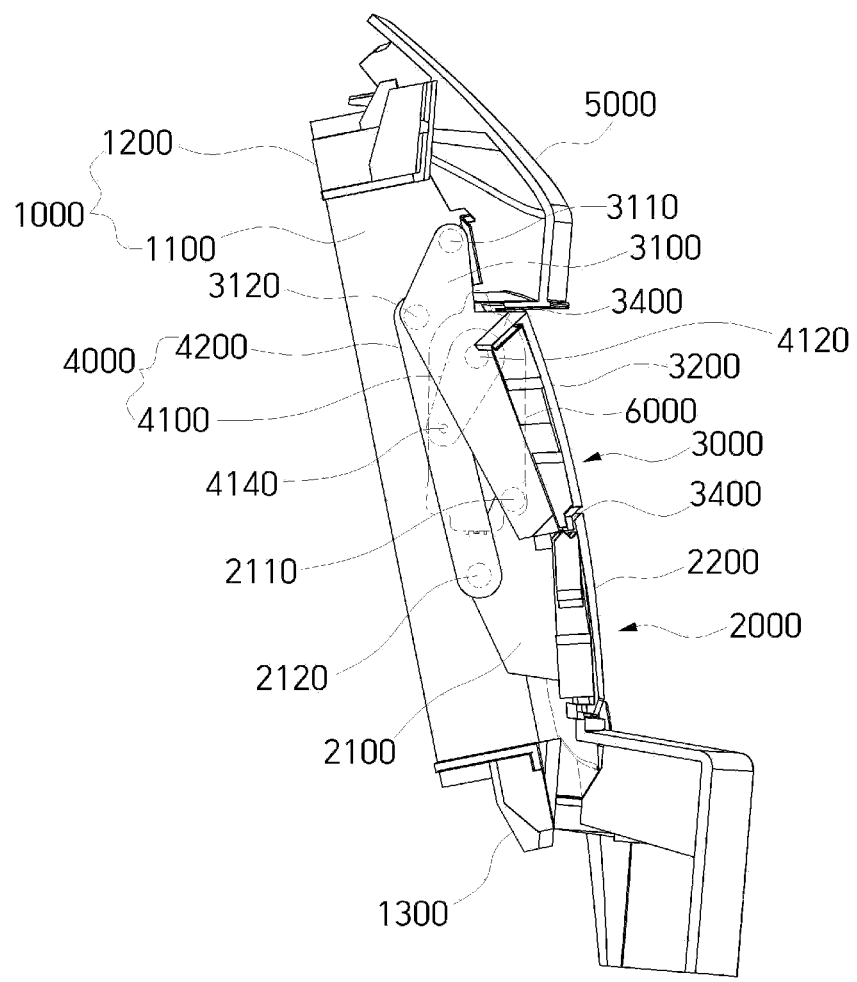
FIGS. 15A to 15C shows an operation flowchart illustrating an operation sequence of the active air flap apparatus for a vehicle according to another embodiment of the present disclosure.
Figure 15B:
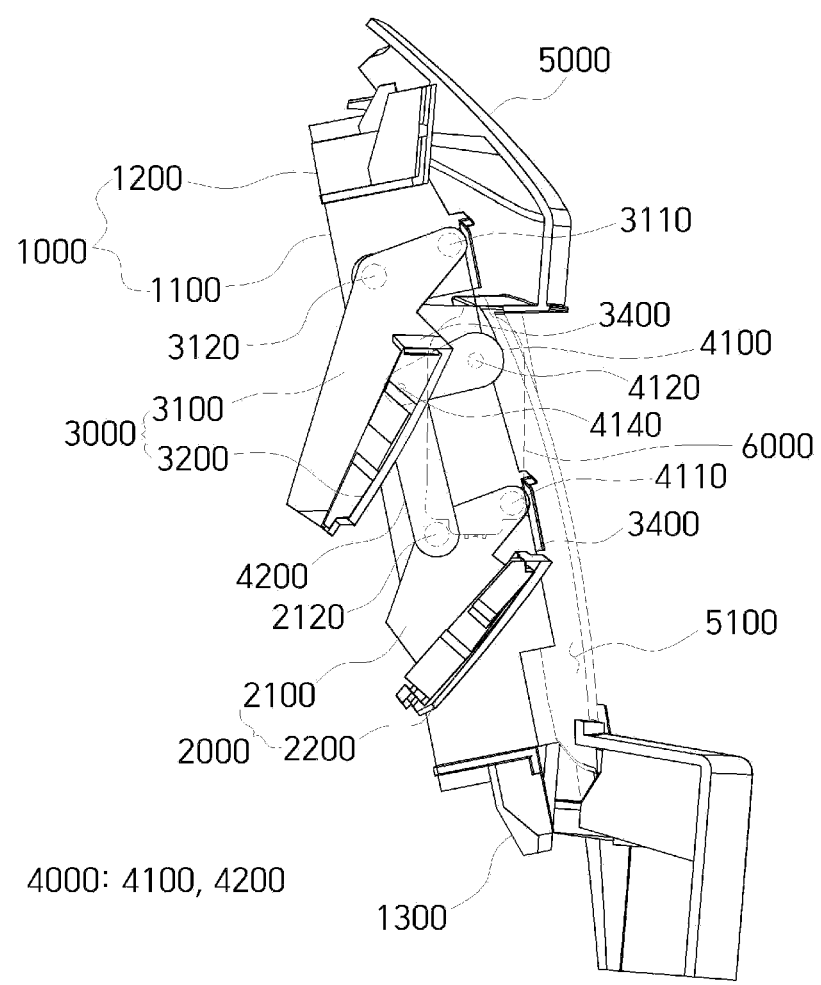
Figure 15C:
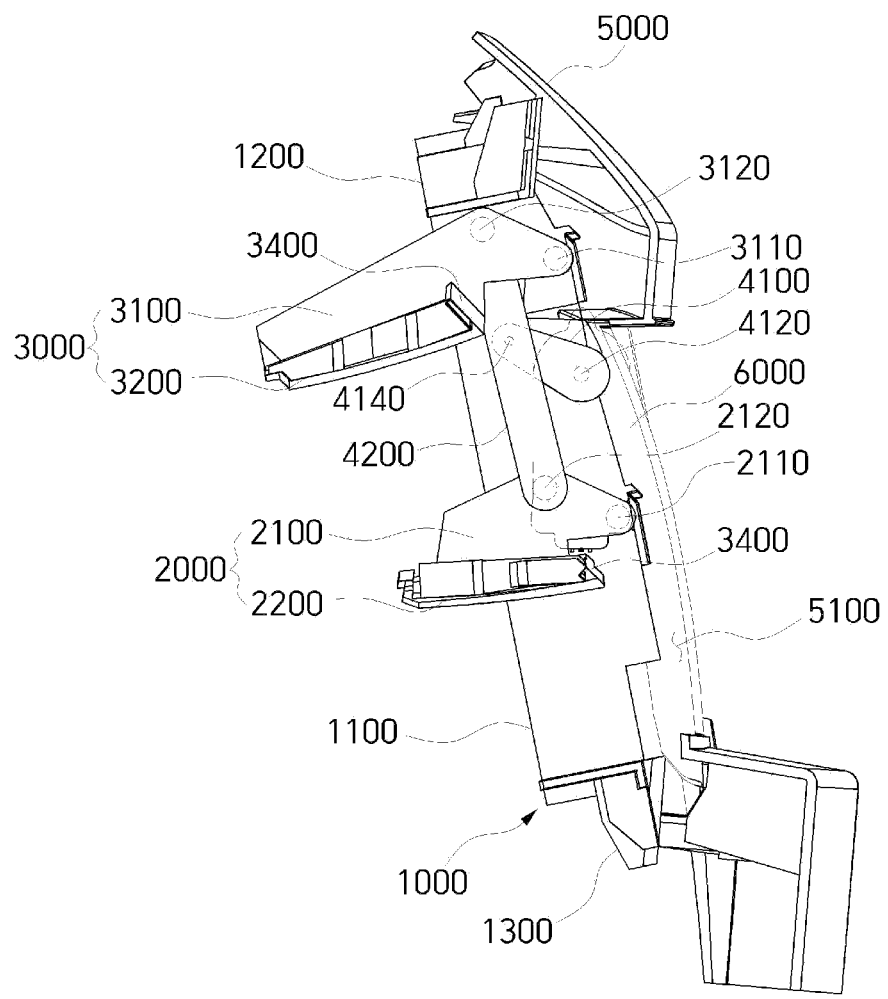

FIGS. 15A to 15C show an operation flowchart illustrating an operation sequence of the active air flap apparatus for a vehicle according to another embodiment of the present disclosure.

The actuator 6000 is coupled to the driving shaft 4120 passing through and protruding from the vertical frame 1100 to one end 4110 of the first connection bar 4100, and the intermediate portion of the second connection bar 4200 is rotatably coupled to the connecting shaft 4140 protruding from the other end 4130 of the first connection bar 4100. That is, the first connection bar 4100 and the second connection bar 4200 are coupled by the connecting shaft 4140.

Moreover, one end 4210 of the second connection bar 4200 is coupled to the first coupling shaft 2120 protruding from the lower end of the first flap fixing portion 2100, and the other end 4230 is coupled to the second coupling shaft 3120 protruding from the lower end of the second flap fixing portion 3100.

In addition, the first rotating shaft 2110 protrudes from the upper end of the first flap fixing portion 2100, and the second rotating shaft 3110 protrudes from the upper end of the second flap fixing portion 3100. The first rotating shaft 2110 and the second rotating shaft 3110 are rotatably coupled to the vertical frames 1100.

In the active air flap apparatus for a vehicle of the present disclosure having the coupling structure as described above, first, as illustrated in FIG. 15A, the first flap guard portion 2200 and the second flap guard portion 3200 constituting the lower flap member 2000 and the upper flap member 3000 close the air inlet 5100 of the grill 5000 to block air from flowing into the engine room through the air inlet 5100.

Moreover, when the actuator 6000 operates, the driving shaft 4120 of the first connection bar 4100 coupled to the actuator 6000 rotates as illustrated in FIG. 15B.

Accordingly, the first connection bar 4100 rotates, and the second connection bar 4200 rotatably coupled to the first connection bar 4100 through the connecting shaft 4140 also rotates.

Therefore, the first flap fixing portion 2100 and the second flap fixing portion 3100, which are rotatably coupled to pass through the first coupling shaft 2120 and the second coupling shaft 3120 formed at one end 4210 and the other end 4230 of the second connection bar 4200, are rotated.

Accordingly, the first flap guard portion 2200 and the second flap guard portion 3200 coupled to the first flap fixing portion 2100 and the second flap fixing portion 3100 open the air inlet 5100 of the grill 5000.

In this case, when the lower flap member 2000 and the upper flap member 3000 are opened 45°, the inclined portions 3400 formed at the upper ends of the first flap guard portion 2200 and the second flap guard portion become 0°, that is, horizontal.

Accordingly, when the lower flap member 2000 and the upper flap member 3000 are opened 45° from the air inlet 5100, the inclined portion 3400 can minimize the air resistance applied to the lower flap member 2000 and the upper flap member 3000 during the traveling of the vehicle.

Moreover, when the first connection bar 4100 and the second connection bar 4200 are further rotated by the driving force of the actuator 6000, as illustrated in FIG. 15C, the lower flap member 2000 and the upper flap member 3000 fully open the air inlet 5100 formed in the grill 5000.

Meanwhile, when the lower flap member 2000 and the upper flap member 3000 are opened by the guide rib 3300 extending in a rhombus shape in the rearward direction of the first flap guard portion 2200 and the second flap guard portion 3200, that is, from the surface in the direction in which the engine room is disposed, air introduced from the outside through the air inlet 5100 can be introduced more efficiently along the guide rib 3300.

In addition, the weight of the lower flap member 2000 tends to be reduced due to the communication holes 3500 formed on the left and right sides of the first flap fixing portion 2100, and when the lower flap member 2000 is opened or closed, the load applied to the actuator 6000 can be significantly reduced.

According to the present disclosure, in the case where the lower flap member and the upper flap member are opened 45° from the air inlet when the vehicle travels, the inclined portion becomes horizontal. Accordingly, it is possible to minimize the air resistance applied to the lower flap member and the upper flap member when the vehicle travels.

In addition, the guide ribs formed on the rear surfaces of the lower flap member and the upper flap member are formed in an X-shape, and the ends in the direction in which the first flap guard portion and the second flap guard portion extend are curved. Accordingly, when the lower flap member and upper flap member are opened, the air introduced through the air inlet from the outside can be efficiently introduced into the engine room along the diagonal and curved surface forming an X shape.

Moreover, the communication holes having a quadrangular frame are formed on the right and left sides of the first flap fixing portion. Accordingly, by reducing the weight of the lower flap member, the load acting on the actuator when the lower flap member is opened or closed can be significantly reduced.

The embodiments disclosed in the present specification should be considered from an exemplary point of view for description rather than a limiting point of view. A scope of the present disclosure is indicated by claims rather than the foregoing description, and all differences within an equivalent scope should be construed as being included in the present disclosure.

What is claimed is:

1. An active air flap apparatus for a vehicle, comprising:
a frame coupled to a rear surface of a grill;
a lower flap member and an upper flap member each having rotatably fixed to the frame to open or close an air inlet disposed in the grill; and
a link member connecting the lower flap member to an actuator to open or close the air inlet,
wherein the lower flap member and the upper flap member have first and second inclined portions extending from one end portion of the lower flap member and one end portion of the upper flap member, respectively, in a rearward direction of the vehicle and having an acute angle with the respective one end portions, and
wherein the first and second inclined portions are inclined substantially at 45°, such that when the lower flap member and the upper flap member are opened substantially 45° from the air inlet, the first and second inclined portions become 0° with respect to the air inlet, to minimize air resistance applied to the lower flap member and the upper flap member during traveling of the vehicle.

2. The active air flap apparatus for a vehicle of claim 1, wherein the frame includes:
two vertical frames disposed to be spaced from each other by a distance; and
two horizontal frames disposed on each of an upper end and a lower end of each of the two vertical frames to connect the two vertical frames to each other.

3. The active air flap apparatus for a vehicle of claim 1, wherein the lower flap member opens or closes a lower region of the air inlet, and
the upper flap member is disposed on an upper portion of the lower flap member to open or close an upper region of the air inlet.

4. The active air flap apparatus for a vehicle of claim 3, wherein a width of the lower flap member is greater than a width of the upper flap member, and
the link member is disposed between the lower flap member and the upper flap member.

5. The active air flap apparatus for a vehicle of claim 2, wherein the lower flap member includes:
two first flap fixing portions rotatably fixed to the two vertical frames, respectively; and
a first flap guard portion disposed on front surfaces of the first flap fixing portions to connect the two first flap fixing portions to each other, and configured to open or close the air inlet according to rotation of the first flap fixing portions, and
the upper flap member includes:
two second flap fixing portions rotatably fixed to the two vertical frames, respectively; and
a second flap guard portion disposed on front surfaces of the second flap fixing portions to connect the two second flap fixing portions to each other, and configured to open or close the air inlet according to rotation of the second flap fixing portions.

6. The active air flap apparatus for a vehicle of claim 5, wherein the first and second inclined portions, inclined substantially at 45° in the rearward direction, extend from upper ends of the first flap guard portion and the second flap guard portion, respectively.

7. The active air flap apparatus for a vehicle of claim 5, wherein the link member includes:
a first connection bar of which a first end is connected to the actuator; and
a second connection bar having a first end, a second end, and an intermediate portion between the first end and the second end of the second connection bar, the intermediate portion being connected to a second end of the first connection bar, the first end of the second connection bar being connected to the lower flap member, and the second end of the second connection bar being connected to the upper flap member.

8. The active air flap apparatus for a vehicle of claim 7, wherein a first rotating shaft, rotatably coupling the first flap guard portion of the lower flap member to the frame, and a first coupling shaft, rotatably coupling the second connection bar to the lower flap member, protrude from each of the first flap fixing portions of the lower flap member,
a second rotating shaft, rotatably coupling the second flap guard portion of the upper flap member to the frame, and a second coupling shaft, rotatably coupling the second connection bar to the upper flap member, protrude from each of the second flap fixing portions of the upper flap member,
a driving shaft, to which the actuator is coupled to pass through the two vertical frames, protrudes from the first end of the first connection bar, and
a connecting shaft, to which the intermediate portion of the second connection bar is rotatably coupled, protrudes from the second end of the first connection bar.

9. The active air flap apparatus for a vehicle of claim 8, wherein the actuator is disposed on an outer surface of one of the two vertical frames, and
the driving shaft passes through the frame to be connected to the actuator.

* * * * *